(12) United States Patent
Nguyen

(10) Patent No.: US 11,560,313 B2
(45) Date of Patent: Jan. 24, 2023

(54) GRAPHENE NANORIBBONS, GRAPHENE NANOPLATELETS AND MIXTURES THEREOF AND METHODS OF SYNTHESIS

(71) Applicant: NTHERMA CORPORATION, Milpitas, CA (US)

(72) Inventor: Cattien V. Nguyen, Fremont, CA (US)

(73) Assignee: NTHERMA CORPORATION, Fremont, CA (US)

( * ) Notice: Subject to any disclaimer, the term of this patent is extended or adjusted under 35 U.S.C. 154(b) by 0 days.

(21) Appl. No.: 16/837,030

(22) Filed: Apr. 1, 2020

(65) Prior Publication Data

US 2020/0270133 A1 Aug. 27, 2020

Related U.S. Application Data

(62) Division of application No. 16/108,676, filed on Aug. 22, 2018, now Pat. No. 10,640,384.

(Continued)

(51) Int. Cl.
*C01B 32/184* (2017.01)
*C01B 32/168* (2017.01)
(Continued)

(52) U.S. Cl.
CPC .......... *C01B 32/184* (2017.08); *C01B 32/162* (2017.08); *C01B 32/168* (2017.08);
(Continued)

(58) Field of Classification Search
CPC ... C01B 32/184; C01B 32/178; C01B 32/168; C01B 32/162; C01B 2204/06; C01B 2204/30; C01P 2006/80
See application file for complete search history.

(56) References Cited

U.S. PATENT DOCUMENTS 7,160,531 B1   1/2007   Jacques et al.
9,388,048 B1   7/2016   Zhou et al.
(Continued)

FOREIGN PATENT DOCUMENTS

CN   104512879 A   4/2015
CN   106660802 A   5/2017
(Continued)

OTHER PUBLICATIONS

Kosynkin, et al., Longitudinal unzipping of carbon nanotubes to form graphene nanoribbons, Nature 2009; 458: 872-877 (Year: 2009).*

(Continued)

*Primary Examiner* — Daniel C. McCracken
(74) *Attorney, Agent, or Firm* — Young Basile Hanlon & MacFarlane, P.C.

(57) ABSTRACT

Provided herein are graphene nanoribbons with high structural uniformity and low levels of impurities and methods of synthesis thereof. Also provided herein are graphene nanoplatelets of superior structural uniformity and low levels of impurities and methods of synthesis thereof. Further provided herein are mixtures of graphene nanoribbons and graphene nanoplatelets of good structural uniformity and low levels of impurities and methods of synthesis thereof. The method includes, for example, the steps of depositing catalyst on a constantly moving substrate, forming carbon nanotubes on the substrate, separating carbon nanotubes from the substrate, collecting the carbon nanotubes from the surface where the substrate moves continuously and sequentially through the depositing, forming, separating and collecting steps. Further processing steps convert the synthesized carbon nanotubes to graphene nanoribbons, graphene nanoplatelets and mixtures thereof.

10 Claims, 17 Drawing Sheets

Related U.S. Application Data

(60) Provisional application No. 62/548,952, filed on Aug. 22, 2017, provisional application No. 62/548,942, filed on Aug. 22, 2017, provisional application No. 62/548,945, filed on Aug. 22, 2017, provisional application No. 62/548,955, filed on Aug. 22, 2017.

(51) Int. Cl.
  *C01B 32/162* (2017.01)
  *C01B 32/178* (2017.01)

(52) U.S. Cl.
  CPC ........ *C01B 32/178* (2017.08); *C01B 2204/06* (2013.01); *C01B 2204/30* (2013.01); *C01P 2006/80* (2013.01)

(56) References Cited

U.S. PATENT DOCUMENTS

| | | | |
|---|---|---|---|
| 2004/0038556 | A1 | 2/2004 | French et al. |
| 2011/0088931 | A1 | 4/2011 | Lettow et al. |
| 2012/0164433 | A1 | 6/2012 | Advincula |
| 2012/0251432 | A1* | 10/2012 | Cooper .................. C23C 16/26 423/447.3 |
| 2013/0101495 | A1 | 4/2013 | Peterson et al. |
| 2014/0099493 | A1 | 4/2014 | Liu et al. |
| 2014/0186550 | A1 | 7/2014 | Cooper et al. |
| 2015/0151528 | A1 | 6/2015 | Shimizu et al. |
| 2015/0360956 | A1 | 12/2015 | Tour et al. |
| 2017/0190925 | A1 | 7/2017 | Wu et al. |
| 2018/0247722 | A1 | 8/2018 | Yang et al. |

FOREIGN PATENT DOCUMENTS

| | | | |
|---|---|---|---|
| JP | 2005-067916 | A | 3/2005 |
| JP | 2005-522340 | A | 7/2005 |
| JP | 2006-305554 | A | 11/2006 |
| JP | 2010-013319 | A | 1/2010 |
| JP | 2012-500179 | A | 1/2012 |
| JP | 2012-172065 | A | 9/2012 |
| JP | 2016-069482 | A | 5/2016 |
| RU | 2409711 | C1 | 1/2011 |
| RU | 2012108641 | A | 9/2013 |
| RU | 2014114285 | A | 10/2015 |
| RU | 2014152182 | A | 7/2016 |
| RU | 2609915 | C2 | 2/2017 |
| WO | 03086961 | A2 | 10/2003 |
| WO | 2010/022164 | A1 | 2/2010 |
| WO | 2011/112589 | A1 | 9/2011 |
| WO | 2015/032646 | A1 | 3/2015 |

OTHER PUBLICATIONS

Huang, et al., 99.9% purity multi-walled carbon nanotubes by vacuum high-temperature annealing, Carbon 2003; 41: 2585-2590 (Year: 2003).*

Wang, et al., The large-scale production of carbon nanotubes in a nano-agglomerate fluidized-bed reactor, Chemical Physics Letters 2002; 364: 568-572 (Year: 2002).*

Shtein, et al., Characterization of Graphene-Nanoplatelets Structure via Thermogravimetry, Anal. Chem. 2015; 87: 4076-4080 (Year: 2015).*

James, et al., The Chemical Synthesis of Graphene Nanoribbons—A Tutorial Review, Macromol. Chem. Phys. 2012; 213: 1033-1050 (Year: 2012).*

Guzman de Villoria, Roberto, A. John Hart, and Brian L. Wardle. "Continuous high-yield production of vertically aligned carbon nanotubes on 2D and 3D substrates " ACS nano 5.6 (2011): 4850-4857.

Zhang Q et al: "Vertically aligned carbon nanotube arrays grown on a lamellar catalyst by fluidized bed catalytic chemical vapor deposition" Carbon, Elsevier Oxford, GB, vol. 47, No. 11, Sep. 1, 2009 (Sep. 1, 2009), pp. 2600-2610.

Koumoulos Elias P et al: "Surface analysis and mechanical behaviour mapping of vertically aligned CNT forest array through nanoindentation" Applied Surface Science, Elsevier, Amsterdam, NL, vol. 396, Nov. 2, 2016 (Nov. 2, 2016), pp. 681-687.

Rasheed A K et al: "Graphene based nanofluids and nanolubricants—Review of recent developments", Renewable and Sustainable Energy Reviews, Elseviers Science, New York, NY, US, vol. 63, Jun. 1, 2016 (Jun. 1, 2016), pp. 346-362.

Kara, M. H., et al. "Influence of catalyst thickness and temperature gradient on MWCNT growth and morphology in TCVD process." TENCON 2011-2011 IEEE Region 10 Conference. IEEE, 2011.

Wall, The Raman Spectroscopy of Graphene and the Determination of Layer Thickness, Thermo Fisher Scientific Application Note: 52252, pp. 1-4 (2011) (Year: 2011).

Huang, J., Zhang, Q., Zhao, M. et al. A review of the large-scale production of carbon nanotubes: The practice of nanoscale process engineering. Chin Sci. Bull. 57, 157-166 (2012) https://doi.org/10.1007/s11434-011-4879-z.

Tabulina et al., Purification Features of Carbon Nanotubes From Impurities After Their Synthesis; Izv. Vyssh. Uchebn. Zaved. Khim. Khim. Tekhnol. 2017. V.60 N 6; 6 pages; Apr. 20, 2017.

Lim CS, Chua CK, Pumera M. Detection of biomarkers with graphene nanoplatelets and nanoribbons. The Analyst. Mar. 2014;139(5):1072-1080. DOI: 10.1039/c3an01585h. PMID: 24400315.

Citation: Paratala BS, Jacobson BD, Kanakia S, Francis LD, Sitharaman B (2012) Physicochemical Characterization, and Relaxometry Studies of Micro-Graphite Oxide, Graphene Nanoplatelets, and Nanoribbons. PLoS ONE 7(6):e38185. https://doi org/10.1371 (journal. pone.0038185.

Strem Chemicals, Inc., 2015 of 07 months, https://www.strem.com/catalog/v/06-0220/carbon_1034343-98-0; 98-0 19.

Shukrullah, Shazia, Mohamed, Norani Muti, Shaharun, Maizatul Shima and Naz, Muhammad Yasin. "Study of surface defects and crystallinity of MWCNTs growth in FCCVD" Science and Engineering of Composite Materials, vol. 24, No. 6, 2017, pp. 845-851.

Wondong Cho, Mark Schulz, Vesselin Shanov, Growth and characterization of vertically aligned centimeter long CNT arrays, Carbon, vol. 72, 2014, pp. 264-273, ISSN 0008-6223, https://doi.org/10.1016/j.carbon.2014.01.074. (https://www.sciencedirect.com/science/article/pii/S000862231400133X).

Anonymous: "Graphene Graphene Nanoribbons & Graphene Nanoplatelets", ntherma, Aug. 19, 2018 (Aug. 19, 2018), pp. 1-6, XP055827848, Retrieved from the Internet: URL:https://web.archive.org/web/20180819010442/http://ntherma.com/product/graphene/ [retrieved on Jul. 27, 2021].

* cited by examiner

402 — Continuously forming CNTs on moving substrate containing metal catalyst

404 — Separating CNTs from moving substrate

406 — Collecting CNTs with high purity and structural uniformity

Fig. 4

GRAPHENE NANORIBBONS, GRAPHENE NANOPLATELETS AND MIXTURES THEREOF AND METHODS OF SYNTHESIS

CROSS REFERENCE TO RELATED APPLICATIONS

This application claims priority under 35 U.S.C. § 119 (e) from U.S. Provisional Application Ser. No. 62/548,942 filed Aug. 22, 2017, U.S. Provisional Application Ser. No. 62/548,945 filed Aug. 22, 2017, U.S. Provisional Application Ser. No. 62/548,952 filed Aug. 22, 2017 and U.S. Provisional Application Ser. No. 62/548,955 filed Aug. 22, 2017 and is a divisional of Ser. No. 16/108,676, filed Aug. 22, 2018 which are all hereby incorporated by reference in their entirety.

FIELD

Provided herein are graphene nanoribbons with high structural uniformity and low levels of impurities and methods of synthesis thereof. Also provided herein are graphene nanoplatelets of superior structural uniformity and low levels of impurities and methods of synthesis thereof. Further provided herein are mixtures of graphene nanoribbons and graphene nanoplatelets of good structural uniformity and low levels of impurities and methods of synthesis thereof. The method includes, for example, the steps of depositing catalyst on a constantly moving substrate, forming carbon nanotubes on the substrate, separating carbon nanotubes from the substrate, collecting the carbon nanotubes from the surface where the substrate moves continuously and sequentially through the depositing, forming, separating and collecting steps. Further processing steps convert the synthesized carbon nanotubes to graphene nanoribbons, graphene nanoplatelets and mixtures thereof.

BACKGROUND

Graphene nanoribbons (GNRs) are a single or a few layers of the well-known carbon allotrope graphitic carbon, which possesses exceptional electrical and physical properties which may lead to application in electronic devices, transistor fabrication and oil additives. GNRs structurally have high aspect ratio with length being much longer than the width or thickness.

Graphene nanoplatelets (GNPs) are similar to GNRs except that that the length is in the micron or sub-micron range and hence GNPs lack the high aspect ratio of GNRs. GNPs also possess many of the useful properties of carbon nanotubes (CNTs) and GNRs.

GNRs have been prepared by CVD and from graphite using chemical processes. Most typically GNRs were prepared from CNTs by chemical unzipping and the quality of GNRs depends the purity of the CNT starting material.

GNPs have been typically prepared from graphite by chemical exfoliation, thermal shock and shear, or in a plasma reactor. However, the above methods fail to provide GNRs and GNPs in high yield, good purity with good control of width and length.

Recently, a number of methods have emerged which convert carbon nanotubes to GNRs in good yield and high purity (Hirsch, Angew Chem. Int. Ed. 2009, 48, 2694). More extreme conditions of some of the above methods used to prepare GNRs can result in the synthesis of GNPs from GNRs. However, the purity and uniformity of carbon nanotubes and of the GNRs and GNPs produced from these CNTs is determined by the method of manufacture of the CNTs.

Current CNT manufacturing methods typically produce CNTs which include significant impurities such as, for example, metal catalysts and amorphous carbons. Purification steps are typically required after synthesis of CNTs, which are flow reactor methods to provide carbon nanotubes which are not contaminated with significant amounts of metal catalysts and amorphous carbon. CNT purification steps require large and expensive chemical plants which makes producing large quantities of CNTs of greater than 90% purity extremely costly. Furthermore, present CNT manufacturing methods produce CNTs with low structural uniformity (i.e., CNTs of variable lengths).

Accordingly, what is needed are new methods for providing high quality and inexpensive GNRs and GNPs with high structural uniformity and purity. These methods will involve preparing CNTs of high structural uniformity and purity which then may be converted to GNRs and GNPs of high structural uniformity and purity.

SUMMARY

The present invention satisfies these and other needs by providing, in one aspect, methods for synthesizing graphene nanoribbons. In some embodiments, the method includes the steps of depositing catalyst on a constantly moving substrate, forming carbon nanotubes on the substrate, separating carbon nanotubes from the substrate, collecting the carbon nanotubes and converting the carbon nanotubes to graphene nanoribbons wherein the substrate moves sequentially through the depositing, forming, separating steps and collecting steps.

In another aspect, graphene nanoribbons of uniform length and greater than 95% purity are provided.

In still another aspect, methods for synthesizing graphene nanoplatelets are provided. In some embodiments, the method includes the steps of depositing catalyst on a constantly moving substrate, forming carbon nanotubes on the substrate, separating carbon nanotubes from the substrate, collecting the carbon nanotubes and converting the carbon nanotubes to graphene nanoplatelets wherein the substrate moves sequentially through the depositing, forming, separating steps and collecting steps.

In still another aspect, graphene nanoplatelets of uniform length and greater than 95% purity are provided.

In still another aspect, methods for synthesizing a mixture of graphene nanoribbons and graphene nanoplatelets are provided. In some embodiments, the method includes the steps of depositing catalyst on a constantly moving substrate, forming carbon nanotubes on the substrate, separating carbon nanotubes from the substrate, collecting the carbon nanotubes and converting the carbon nanotubes to a mixture of graphene nanoribbons and graphene nanoplatelets wherein the substrate moves sequentially through the depositing, forming, separating steps and collecting steps.

In still another aspect, a mixture of graphene nanoribbon and graphene nanoplatelets of uniform length and greater than 95% purity are provided.

BRIEF DESCRIPTION OF THE FIGURES

FIG. 4 illustrates an exemplary flowchart for continuous synthesis of carbon nanotubes, which includes the steps of forming CNTs on the moving substrate containing metal substrate; separating CNTs from the moving substrate; and collecting carbon nanotubes of high purity and structural uniformity.

DETAILED DESCRIPTION

Definitions

Figure 1:
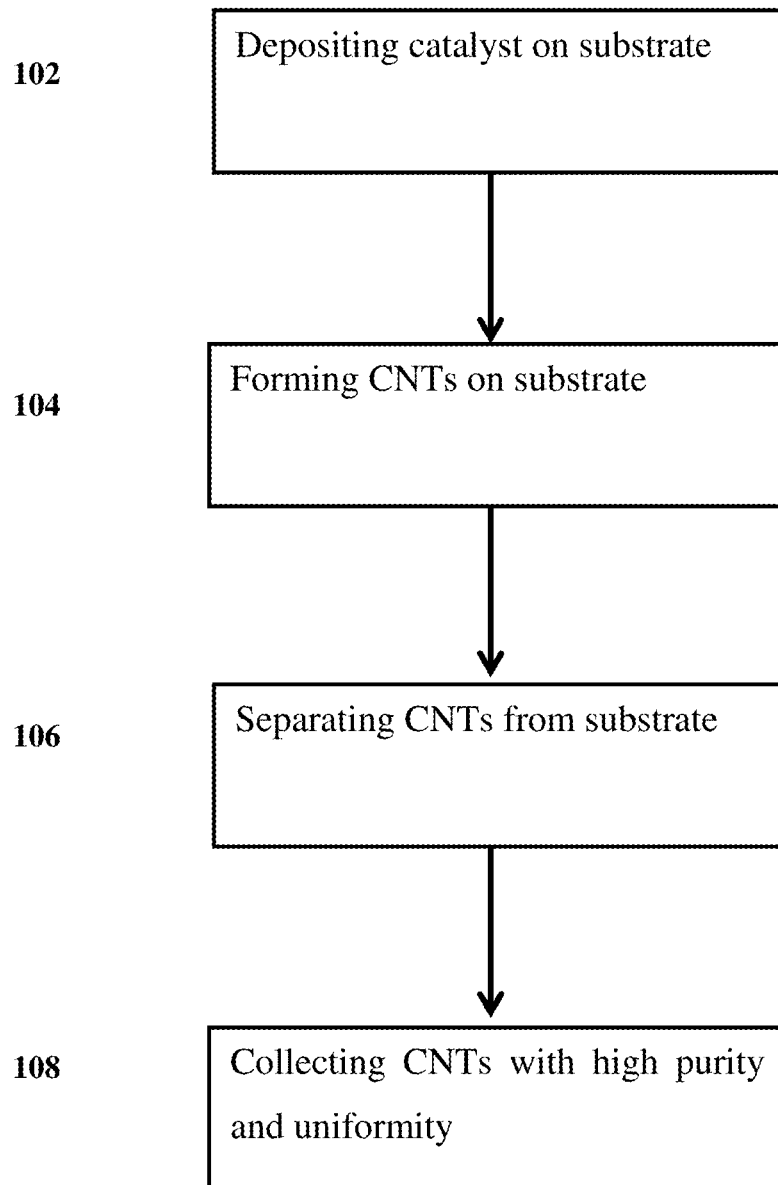
FIG. 1 illustrates an exemplary flowchart for synthesis of carbon nanotubes, which includes the steps of depositing catalyst on a substrate; forming carbon nanotubes on a substrate; separating carbon nanotubes from the substrates; and collecting carbon nanotubes of high purity and structural uniformity

Unless defined otherwise, all technical and scientific terms used herein have the same meaning as is commonly understood by one of ordinary skill in the art to which this invention belongs. If there is a plurality of definitions for a term herein, those in this section prevail unless stated otherwise.

As used herein "carbon nanotubes" refer to allotropes of carbon with a cylindrical structure. Carbon nanotubes may have defects such as inclusion of C5 and/or C7 ring structures, such that the carbon nanotube is not straight, may have contain coiled structures and may contain randomly distributed defected sites in the C—C bonding arrangement. Carbon nanotubes may contain one or more concentric cylindrical layers. The term "carbon nanotubes" as used herein includes single walled carbon nanotubes, double walled carbon nanotubes multiwalled carbon nanotubes alone in purified form or as mixture thereof. In some embodiment, the carbon nanotubes are multi-walled. In other embodiments, the carbon nanotubes are single-walled. In still other embodiments, the carbon nanotubes are double-walled. In still other embodiments, the carbon nanotubes are a mixture of single-walled and multi-walled nanotubes. In still other embodiments, the carbon nanotubes are a mixture of single-walled and double-walled nanotubes. In still other embodiments, the carbon nanotubes are a mixture of double-walled and multi-walled nanotubes. In still other embodiments, the carbon nanotubes are a mixture of single-walled, double-walled and multi-walled nanotubes.

As used herein "multi-walled carbon nanotubes" refer to carbon nanotubes composed of multiple concentrically nested graphene sheets with interlayer distances like graphite.

As used herein "double-walled carbon nanotubes" refer to carbon nanotubes with two concentrically nested graphene sheets As used herein "single-walled carbon nanotubes" refer to carbon nanotubes with a single cylindrical graphene layer.

As used herein "vertically-aligned carbon nanotubes" refer to an array of carbon nanotubes deposited on a substrate wherein the structures of carbon nanotubes are physically aligned perpendicular to the substrate.

As used herein "catalysts" or "metal catalysts" refer to a metal or a combination of metals such as Fe, Ni, Co, Cu, Ag, Pt, Pd, Au, etc. that are used in the breakdown of hydrocarbon gases and aid in the formation of carbon nanotubes by chemical vapor deposition process.

As used herein "chemical vapor deposition" refers to plasma-enhanced chemical vapor deposition, thermal chemical vapor deposition, alcohol catalytic CVD, vapor phase growth, aerogel supported CVD and lase assisted CVD As used herein "plasma-enhanced chemical vapor deposition" refers to the use of plasma (e.g., glow discharge) to transform a hydrocarbon gas mixture into excited species which deposit carbon nanotubes on a surface.

As used herein "thermal chemical vapor deposition" refers to the thermal decomposition of hydrocarbon vapor in the presence of a catalyst which may be used to deposit carbon nanotubes on a surface.

As used herein "physical vapor deposition" refers to vacuum deposition methods used to deposit thin films by condensation of a vaporized of desired film material onto film materials and includes techniques such as cathodic arc deposition, electron beam deposition, evaporative deposition, pulsed laser deposition and sputter deposition.

As used herein "forming carbon nanotubes" refers to any vapor deposition process, including the chemical and physical vapor deposition methods described herein, for forming carbon nanotubes on a substrate in a reaction chamber.

Carbon nanotubes are relatively new materials with exceptional physical properties, such as superior current carrying capacity, high thermal conductivity, good mechanical strength, and large surface area, which are advantageous in a number of applications. Carbon nanotubes possess exceptional thermal conductivity with a value as high as 3000 W/mK which is only lower than the thermal conductivity of diamond. Carbon nanotubes are mechanically strong, thermally stable above 400° C. under atmospheric conditions and have reversible mechanical flexibility particularly when vertically aligned. Accordingly, carbon nanotubes can mechanically conform to different surface morphologies because of this intrinsic flexibility. Additionally, carbon nanotubes have a low thermal expansion coefficient and retain flexibility in confined conditions under elevated temperatures.

Economically providing carbon nanotubes, in a controlled manner with practical and simple integration and/or packaging is essential for implementing many carbon nanotube technologies. Devices and methods which provide large quantities of carbon nanotubes of exceptional purity and uniform length are provided herein. The CNTs synthesized herein do not require costly post-synthesis purification.

Briefly the general feature of the method are as follows. First, a metal catalyst is coated on the surface and the substrate is heated at high temperature. Then catalyst is then coated on the surface of the substrate at high temperature to provide nanoparticles of catalyst on the substrate, which serve as initiation site for CNT synthesis. CNTs are synthesized by supplying a carbon source to the catalyst. Accordingly, a mixture of carbon source and carrier gas is flowed into a chamber which included heated substrate coated with catalyst to provide substrate with attached CNTs. Finally, synthesized CNTs are extracted from the substrate and collected. Optionally, the substrate coated with catalyst is regenerated.

In some embodiments, the catalyst is deposited on the substrate by sputtering, evaporation, dip coating, print screening, electrospray, spray pyrolysis or ink jet printing. The catalyst may be then chemically etched or thermally annealed to induce catalyst particle nucleation. The choice of catalyst can lead to preferential growth of single walled CNTs over multi-walled CNTs.

In some embodiments, the catalyst is deposited on a substrate by immersing the substrate in a solution of the catalyst. In other embodiments, the concentration of the catalyst solution in aqueous or organic solvents water is between about 0.01% and about 20%. In still other embodiments, the concentration of the catalyst solution in aqueous or organic solvents water is between about 0.1% and about 10%. In still other embodiments, the concentration of the catalyst solution in aqueous or organic solvents water is between about 1% and about 5%.

The temperature of the chamber where CNTs are made should be a temperature lower than the melting temperature of substrate, lower than the decomposition temperate of carbon source and higher than the decomposition temperature of the catalyst raw material. The temperature range for growing multi-walled carbon nanotubes is between about 600° C. to about 900° C., while the temperature range for growing single walled CNTs is between about 700° C. to about 1100° C.

In some embodiments, CNTs are formed by chemical vapor deposition on a substrate containing metal catalysts for the growth of CNTs. It is important to note that continuous CNT formation on a constantly moving substrate allows the CNTs to have uniform lengths. Typical feedstocks include, but are not limited to, carbon monoxide, acetylene, alcohols, ethylene, methane, benzene, etc. Carrier gases are inert gases such as for example, argon, helium, or nitrogen, while hydrogen is a typical reducing gas. The composition of the gas mixture and duration of substrate exposure regulates the length of synthesized CNTs. Other methods known to those of skill in the art such as, for example, the physical vapor deposition methods described, supra, the method of Nikolaev et al., Chemical Physics Letter, 1999, 105, 10249-10256 and nebulized spray pyrolysis (Rao et al., Chem. Eng. Sci. 59, 466, 2004) may be used in the methods and devices described herein. Conditions well known to those of skill in the art may be used to prepare carbon nanotubes using any of the methods above.

Referring now to FIG. 1, a method for synthesizing carbon nanotubes is provided. The method may be performed in discrete steps, as illustrated in FIG. 1. Those of skill in the art will appreciate that any combination of the steps can be performed continuously, if desired. A catalyst is deposited on a substrate at 102, carbon nanotubes are formed on the substrate at 104, carbon nanotubes are separated from the substrate at 106 and the carbon nanotubes are collected at 108.

Figure 2:
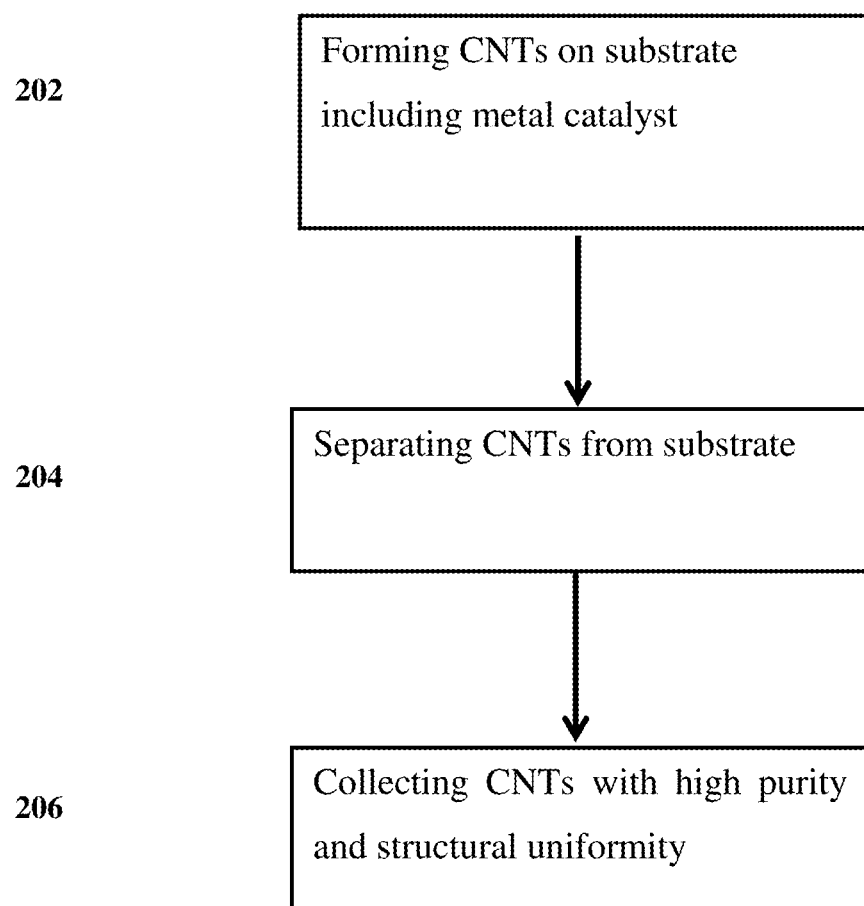
FIG. 2 illustrates an exemplary flowchart for synthesis of carbon nanotubes, which includes the steps of forming carbon nanotubes on a substrate; separating carbon nanotubes from the substrates; and collecting carbon nanotubes of high purity and structural uniformity.

Referring now to FIG. 2, another method for synthesizing carbon nanotubes is provided. The method may be performed in discrete steps, as illustrated in FIG. 2. Those of skill in the art will appreciate that any combination of the steps can be performed continuously, if desired. Carbon nanotubes are formed on a substrate, which already contains catalyst at 202, carbon nanotubes are separated from the substrate at 204 and the carbon nanotubes are collected at 206.

Figure 3:
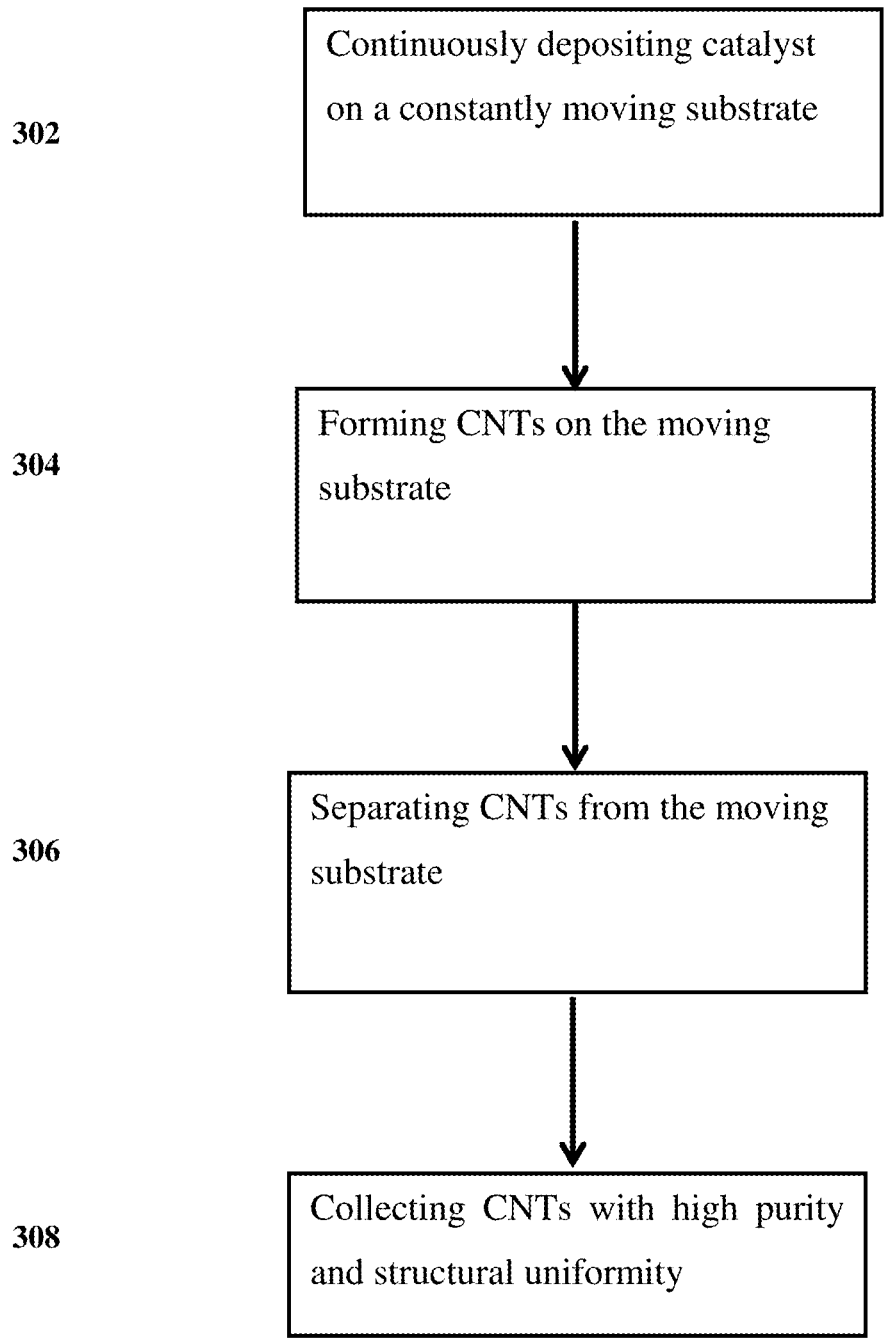
FIG. 3 illustrates an exemplary flowchart for continuous synthesis of carbon nanotubes, which includes the steps of continuously depositing catalyst on a constantly moving substrate; forming CNTs on the moving substrate; separating CNTs from the moving substrate; and collecting carbon nanotubes of high purity and structural uniformity.

Referring now to FIG. 3, another method for synthesizing carbon nanotubes is provided. The method is performed continuously. A catalyst is continuously deposited on a moving substrate at 302, carbon nanotubes are continuously formed on the moving substrate at 304, carbon nanotubes are continuously separated from the substrate at 306 and the carbon nanotubes are continuously collected at 308. The substrate may be cycled through the steps described herein once or optionally, many times, such as, for example, more than 50 time, more than 1,000 time or more than 100,000 times.

Referring now to FIG. 4, another method for synthesizing carbon nanotubes is provided. The method is performed continuously as illustrated. Carbon nanotubes are continuously formed on the moving substrate which already contains catalyst at 402, carbon nanotubes are continuously separated from the substrate at 404 and the carbon nanotubes are continuously collected at 406. In some embodiments, the substrate is cycled through the deposition, forming and separating steps more than 50 times, more than 1,000 time or more than 100,0000 times.

Deposition of CNTs on a moving substrate provides CNTs that are of both high purity and high length uniformity. Moreover, controlling process conditions enables the customization of CNT length. For example, variation of the rate of the moving substrate through the production process modifies CNT length; faster rates though the CNT deposition module produces CNT of shorter length, while slower rates will produce CNT of longer length.

In some embodiments, the substrate is completely covered by metal foil. In these embodiments, the substrate may be any material stable to conditions of catalyst deposition and CNT synthesis. Many such material are known to those of skill in the art and include, for example, carbon fibers, carbon foil, silicon, quartz, etc. In other embodiments, the substrate is a metal foil which can be continuously advanced through the various steps of the methods described herein.

In some embodiments, the thickness of the metal foil is greater than 10 μM. In other embodiments, the thickness of the metal foil is between about 10 μM and about 500 μM. In still other embodiments, the thickness of the metal foil is between about 500 μM and about 2000 μM. In still other embodiments, the thickness of the metal foil is between about 0.05 μM and about 100 cm. In other embodiments, the thickness of the metal foil is between about 0.05 μM and about 100 cm. In other embodiments, the thickness of the metal foil is between about 0.05 mm and about 5 mm. In still other embodiments, the thickness of the metal foil is between about 0.1 mm and about 2.5 mm. In still other embodiments, the thickness of the metal foil is between about 0.5 mm and about 1.5 mm. In still other embodiments, the thickness of the metal foil is between about 1 mm and about 5 mm. In still other embodiments, the thickness of the metal foil is between about 0.05 mm and about 1 mm. In still other embodiments, the thickness of the metal foil is between about 0.05 mm and about 0.5 mm. In still other embodiments, the thickness of the metal foil is between about 0.5 mm and about 1 mm. In still other embodiments, the thickness of the metal foil is between about 1 mm and about 2.5 mm. In still other embodiments, the thickness of the metal foil is between about 2.5 mm and about 5 mm. In still other embodiments, the thickness of the metal foil is between about 100 μM and about 5 mm. In still other embodiments, the thickness of the metal foil is between about 10 μM and about 5 mm. In still other embodiments, the thickness of the metal foil is greater than 100 μM. In still other embodiments, the thickness of the metal foil is less than 100 μM.

In some embodiments, the metal foil includes iron, nickel, aluminum, cobalt, copper, chromium, gold, silver, platinum, palladium or combinations thereof. In other embodiments, the metal foil includes iron, nickel, cobalt, copper, gold or combinations thereof. In some embodiments, the metal foil may be coated with organometallocenes, such as, for example, ferrocene, cobaltocene or nickelocene.

In some embodiments, the metal foil is an alloy of two or more of iron, nickel, cobalt, copper, chromium, aluminum, gold or combinations thereof. In other embodiments, the metal foil is an alloy of two or more of iron, nickel, cobalt, copper, gold or combinations thereof.

In some embodiments, the metal foil is high temperature metal alloy. In other embodiments, the metal foil is stainless steel. In still other embodiments, the metal foil is a high temperature metal alloy on which a catalyst is deposited for growing carbon nanotubes. In still other embodiments, the metal foil is stainless steel on which a catalyst is deposited for growing carbon nanotubes.

In some embodiments, the metal foil is a metal or combination of metals which are thermally stable at greater than 400° C. In other embodiments, the metal foil is a metal or combination of metals which are thermally stable at greater than 500° C., greater than 600° C., greater than 700° C. or greater than 1000° C. In some of the above embodiments, the combination of metals is stainless steel.

In some embodiments, the metal foil has a thickness of less than about 100 μM and a surface root mean square roughness of less than about 250 nm. In some embodiments, the metal foil has a thickness of greater than about 100 μM and a surface root mean square roughness of less than about 250 nm. In still other embodiments, the metal foil has a thickness of less than about 100 μM and a surface root mean square roughness of less than about 250 nm and includes iron, nickel, cobalt, copper, gold or combinations thereof. In still other embodiments, the metal foil has a thickness of greater than about 100 μM and a surface root mean square roughness of less than about 250 nm and includes iron, nickel, cobalt, copper, gold or combinations thereof. In still other embodiments, the metal foil has a thickness of less than about 100 μM and a surface root mean square roughness of less than about 250 nm and includes a catalyst film. In still other embodiments, the metal foil has a thickness of greater than about 100 μM and a surface root mean square roughness of less than about 250 nm and includes a catalyst film. In some of the above embodiments, the root mean square roughness is less than about 100 nm.

In some embodiments, the substrate continuously advances through the steps of the above methods at a rate greater than 0.1 cm/minute. In other embodiments, the substrate continuously advances through the steps of the above methods at a rate greater than 0.05 cm/minute. In sill other embodiments, the substrate continuously advances through the steps of the above methods at a rate greater than 0.01 cm/minute. In still other embodiments, the substrate is cycled through the deposition, forming, separating and collecting steps more than 10 times 50 times, more than 1,000 times or more than 100,0000 times.

In some embodiments, the substrate is wider than about 1 cm. In other embodiments, the substrate has a length greater than 1 m, 10 m, 100 m, 1,000 m or 10,000 m. In some of these embodiments, the substrate is a metal foil.

In some embodiments, carbon nanotubes are formed on all sides of the substrate. In other embodiments, carbon nanotubes are formed on both sides of the metal foil.

In some embodiments, the concentration of catalyst deposited on the substrate is between about 0.001% and about 25%. In other embodiments, the concentration of catalyst deposited on the substrate is between about 0.1% and about 1%. In still other embodiments, the concentration of catalyst deposited on the substrate is between about 0.5% and about 20%.

In some embodiments, the concentration of carbon nanotube on the substrate is between about 1 nanotube per μM and about 50 nanotubes per μM. In other embodiments, the concentration of carbon nanotube on the substrate is between about 10 nanotubes per μM and about 500 nanotubes per μM.

In some embodiments, the CNTs are separated from the substrate by mechanical removal of the CNTs from the surface of the substrate. In other embodiments, separation of CNTs from the substrate involves removing the CNTs from the surface of the substrate with a mechanical tool (e.g., a blade, an abrasive surface, etc.) thus yielding high purity CNTs with little or no metal impurities, which do not require any additional purification. In still other embodiments, separation of CNTs from the substrate involves chemical methods that disrupt adhesion of CNTs to the substrate. In yet other embodiments, ultrasonication disrupts adhesion of CNTs to the substrate. In still other embodiments, pressurized gas flow disrupts adhesion of CNTs to the substrate. The combination of depositing CNTs on a substrate and separating CNTs from the substrate renders CNT products of uniform length free of catalyst and amorphous carbon impurities.

The CNTs can be collected in or on any convenient object, such as for example, an open vessel, a wire mesh screen, a solid surface, a filtration device, etc. The choice of collection device will be correlated with the method used to disrupt adhesion of CNTs to the substrate.

In some embodiments, the carbon nanotubes are randomly aligned. In other embodiments, the carbon nanotubes are vertically aligned. In still other embodiments, the uniform length is on average about 50 µM, about 100 µM, about 150 µM or about 200 µM. In still other embodiments, the uniform length can range from 50 µM to 2 cm. In general, the uniform length is about +/−10% of the stated length. Accordingly, a sample with a uniform length of about 100 µM will include nanotubes of length between 90 µM and 110 µM. In still other embodiments, carbon nanotubes are vertically aligned and are of uniform length.

In some embodiments, the density of the carbon nanotubes is between about 2 mg/cm$^2$ and about 1 mg/cm$^2$. In other embodiments, the density of the carbon nanotubes between about 2 mg/cm$^2$ and about 0.2 mg/cm$^2$.

In some embodiments, vertically aligned carbon nanotubes have a thermal conductivity of greater than about 50 W/mK. In other embodiments, vertically aligned carbon nanotubes have a thermal conductivity of greater than about 70 W/mK.

In some embodiments, the thickness of the vertically aligned carbon nanotubes is between than about 100 µm and about 500 µm. In other embodiments, the thickness of the vertically aligned carbon nanotubes is less than about 100 µm.

In some embodiments, the carbon nanotubes are of greater than 90%, 95%, 99%, 99.5% or 99.9% purity. In other embodiments, the carbon nanotubes are of greater than 90%, 95%, 99%, 99.5% or 99.9% purity and are of uniform length of about 10 µM, about 20 µM, about 50 µM, about 100 µM, about 150 µM or about 200 µM. In still other embodiments, the carbon nanotubes are vertically aligned, of greater than 90%, 95%, 99%, 99.5% or 99.9% purity and are of uniform length of about 50 µM, about 100 µM, about 150 µM or about 200 µM.

In some embodiments, the tensile strength of the carbon nanotubes is between about 11 GPa and about 63 GPa. In other embodiments, the tensile strength of the carbon nanotubes is between about 20 GPa and about 63 GPa. In still other embodiments, the tensile strength of the carbon nanotubes is between about 30 GPa and about 63 GPa. In still other embodiments, the tensile strength of the carbon nanotubes is between about 40 GPa and about 63 GPa. In still other embodiments, the tensile strength of the carbon nanotubes is between about 50 GPa and about 63 GPa. In still other embodiments, the tensile strength of the carbon nanotubes is between about 20 GPa and about 45 GPa.

In some embodiments, the elastic modulus of the carbon nanotubes is between about 1.3 TPa and about 5 TPa. In other embodiments, the elastic modulus of the carbon nanotubes is between about 1.7 TPa and about 2.5 TPa. In still other embodiments, the elastic modulus of the carbon nanotubes is between about 2.7 TPa and about 3.8 TPa.

Figure 5:
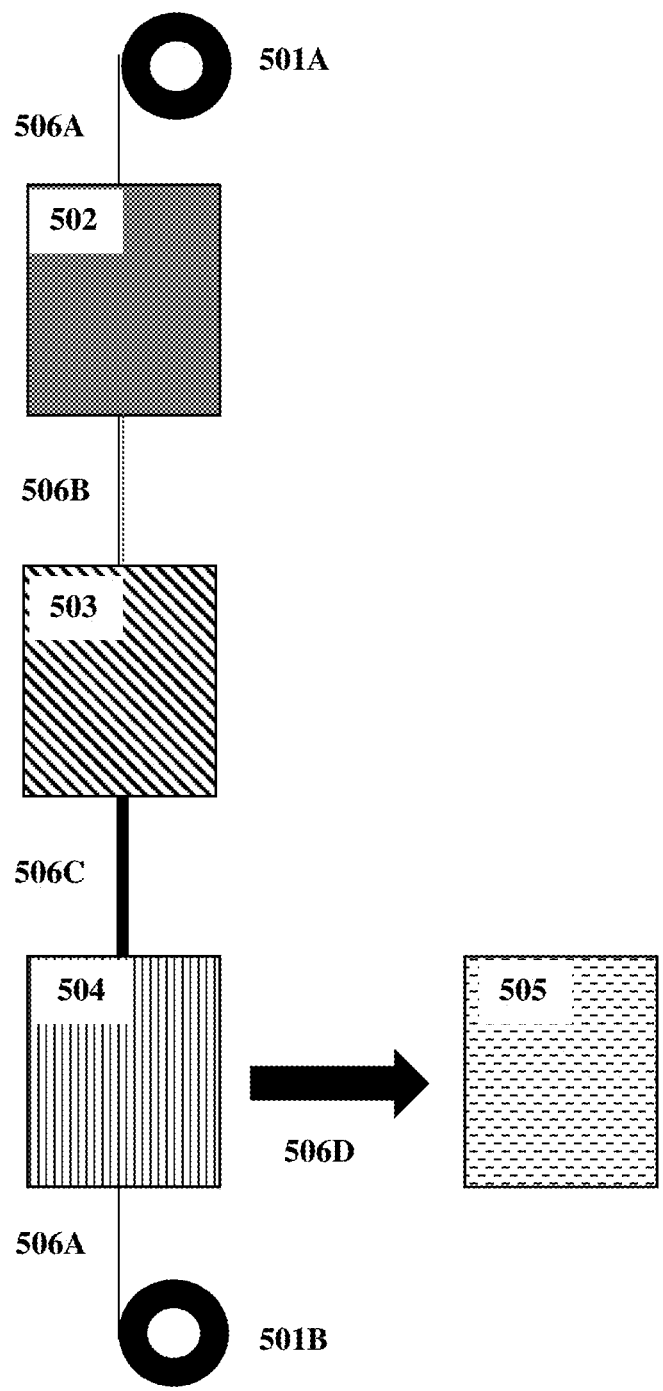
FIG. 5 schematically illustrates a device for the continuous synthesis of carbon nanotubes, which includes various modules sequentially disposed such as a transport module for advancing the substrate through the modules; a catalyst module; a nanotube synthesis module; a separation module; and a collection module.

Referring now to FIG. 5, a device for continuously synthesizing CNTs is provided. Transport module includes drums 501A and 501B, which are connected by substrate 506. Substrate 506 continuously moves from drum 501A through catalyst module 502, nanotube synthesis module 503 and separation module 504 to drum 501B. Note that naïve substrate 506A, is modified by catalyst module 502 to provide substrate 506B which contains catalyst. In some embodiments, catalyst module 502 is a solution of catalyst in which substrate 506A is immersed. Carbon nanotubes are continuously formed on substrate 506B during transit through nanotube synthesis module 503 to yield substrate 506C, which includes carbon nanotubes. In some embodiments, nanotube synthesis module 503 is a CVD chamber. Substrate 506C is continuously processed by separation module 504 and stripped of attached carbon nanotubes to yield substrate 506A, which is then collected by drum 501B. In some embodiments, separation module 504 includes a blade which mechanically shears the newly formed CNTs from substrate 506C. Note that carbon nanotubes removed from substrate 506C are continuously collected by process 506D at collection module 505. In some embodiments, collection module 505 is simply an empty vessel situated appropriately to collect the CNTs separated from the substrate surface by separation module 504. In the above embodiment, substrate 506 is not recycled during the production run.

Figure 6:
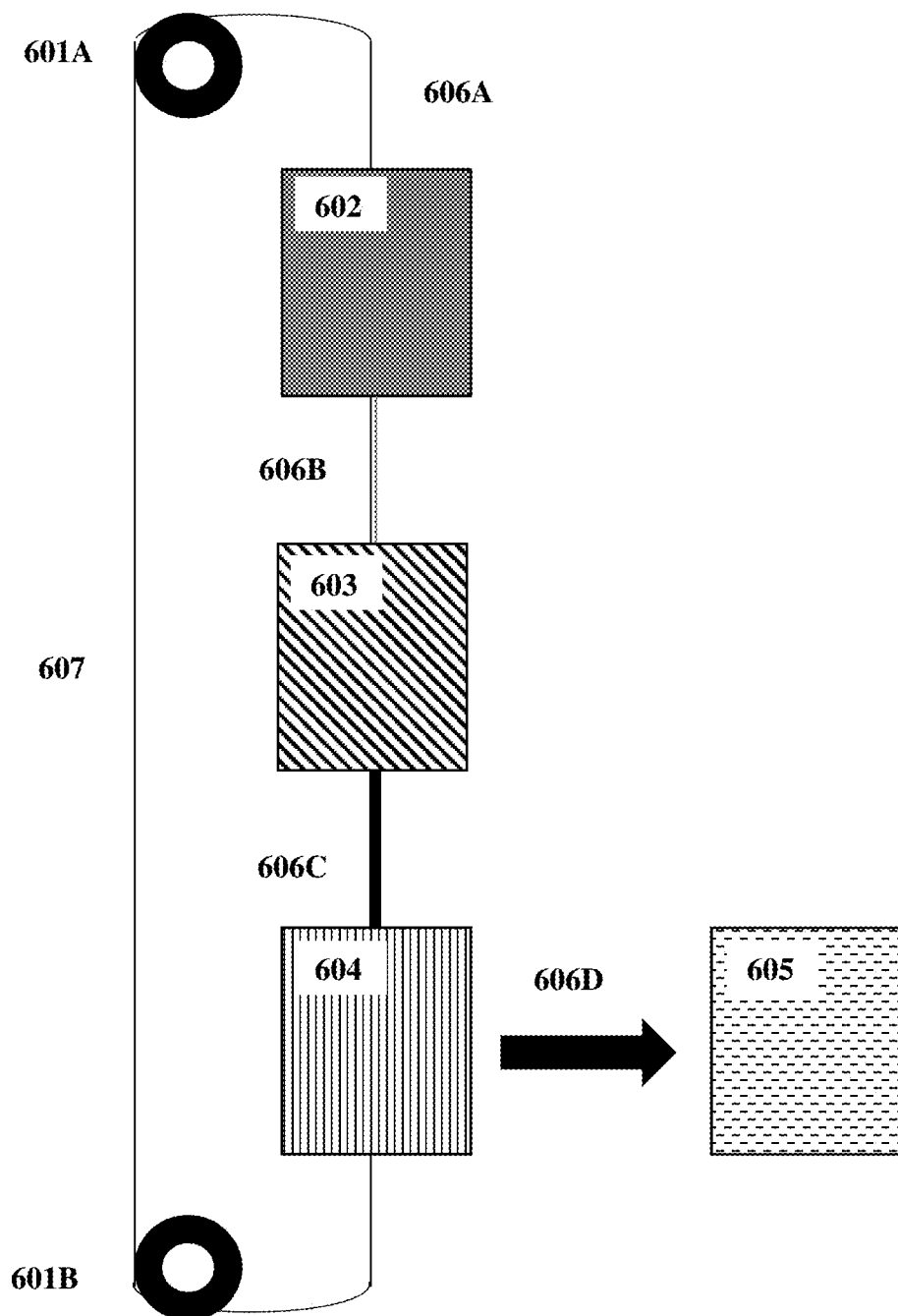
FIG. 6 schematically illustrates a device with closed-loop feeding of substrate for the continuous synthesis of carbon nanotubes which includes various modules sequentially disposed such as a transport module for advancing the substrate through the modules; a catalyst module; a nanotube synthesis module; a separation module; and a collection module.

Referring now to FIG. 6, another device for continuously synthesizing CNTs is schematically illustrated. Transport module includes drums 601A and 601B, which are connected by substrate 606. Substrate 606 continuously moves from drum 601A through catalyst module 602, nanotube synthesis module 603 and separation module 604 to drum 601B. Note that naïve substrate 606A, is modified by catalyst module 602 to provide substrate 606B which contains catalyst. In some embodiments, catalyst module 502 is a solution of catalyst in which substrate 606A is immersed. Carbon nanotubes are continuously formed on substrate 606B during transit through nanotube synthesis module 603 to yield substrate 506C. In some embodiments, nanotube synthesis module 603 is a CVD chamber. Substrate 606C is continuously processed by separation module 604 and stripped of attached carbon nanotubes to yield substrate 606A, which is then collected by drum 601B. In some embodiments, separation module 604 includes a blade which mechanically shears the newly formed CNTs from substrate 606C. Note that carbon nanotubes removed from substrate 606C are continuously collected by process 606D at collection module 605. In some embodiments, collection module 605 is simply an empty vessel situated appropriately to collect the CNTs separated from the substrate surface by separation module 604. In the above embodiment, the substrate is recycled through the production run at least once.

Although many of the above embodiments have been described as synthesizing nanotubes continuously, those of skill in the art will appreciate that the methods and devices described herein may be practiced discontinuously.

Figure 7:
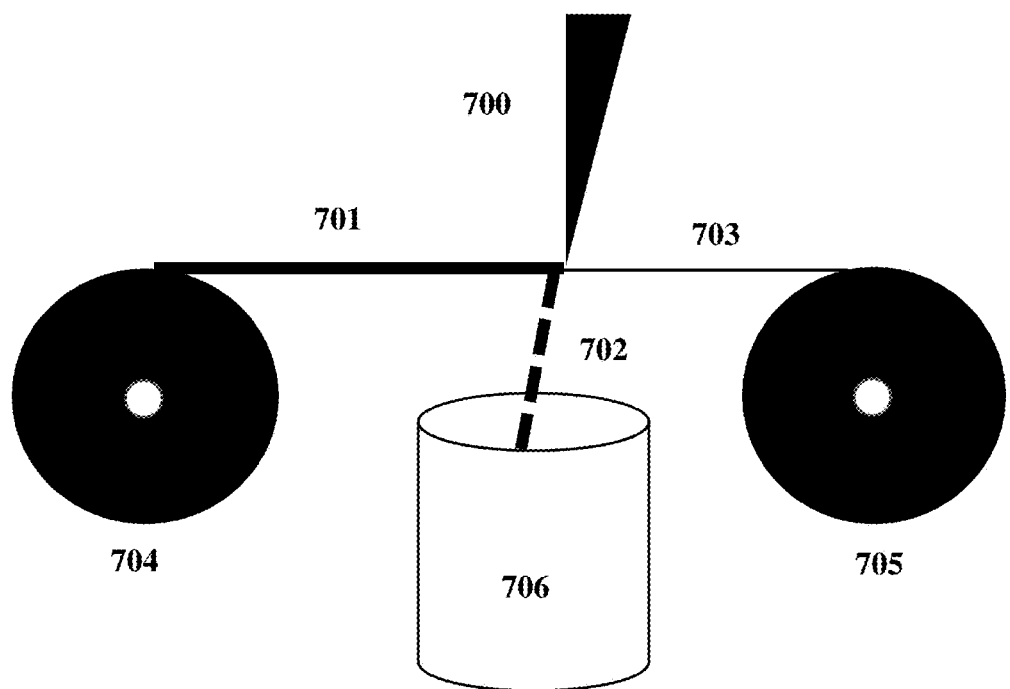
FIG. 7 schematically illustrates an exemplary separation module.

FIG. 7 schematically illustrates an exemplary separation module. Drum 704 advances substrate 701, which has been processed by catalyst module (not shown) and carbon nanotube deposition module (not shown) and which is covered with carbon nanotubes to tool 700, which removes carbon nanotubes 702 to provide substrate 703 devoid of carbon nanotubes. In some embodiments, tool 700 is a cutting blade. The substrate 703 is collected by drum 705. Carbon nanotubes 702 are collected in container 706. Substrate 701, as illustrated, is coated on only one side with carbon nanotubes. Those of skill in the art will appreciate that nanotubes can be grown on both sides of the substrate and that a substrate with both sides coated can be processed in a manner analogous to that described above.

Figure 8:
FIG. 8 schematically illustrates a horizontal view of a rectangular quartz chamber, that includes multiple substrates, which may be used in the nanotube synthesis module.
Figure 9:
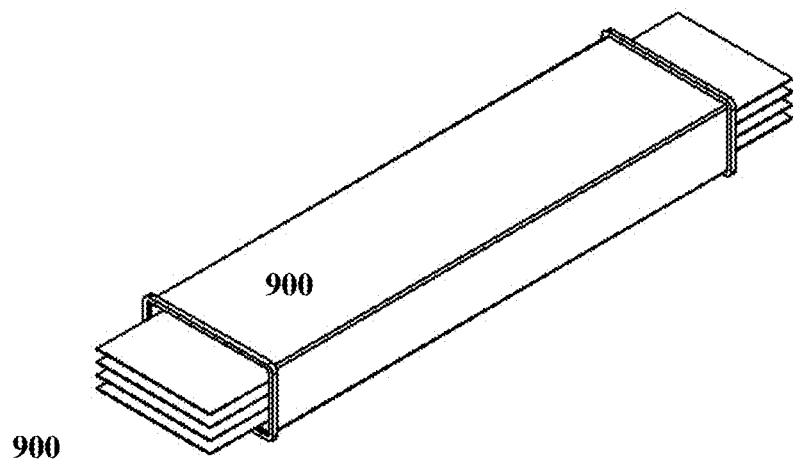
FIG. 9 illustrates a perspective view of a rectangular quartz chamber, that includes multiple substrates, which may be used in the nanotube synthesis module.

FIG. 8 illustrates a horizontal view of an exemplary rectangular quartz chamber 800, which may be used in the nanotube synthesis module that includes multiple substrates 801, which contain catalyst. FIG. 9 illustrates a perspective view of an exemplary rectangular quartz chamber 900, which may be used in the nanotube synthesis module that includes multiple substrates 901, which contain catalyst. The quartz chamber includes shower heads (not shown) for carrier gases and carbon feedstocks and may be heated at temperatures sufficient to form CNTs. In some embodiment, the chamber has inner chamber thickness of greater than 0.2 inch. In other embodiments, more than substrate is processed by the chamber simultaneously.

CNTs can be characterized by a multitude of techniques, including, for example, Raman, spectroscopy, UV, visible, near infrared spectroscopy, florescence and X-ray photoelectron spectroscopy, thermogravimetric analysis, atomic force microscopy, scanning tunneling, microcopy, scanning electron microscopy and tunneling electron microscopy. A combination of many, if not all of the above are sufficient to fully characterize carbon nanotubes.

Figure 14:
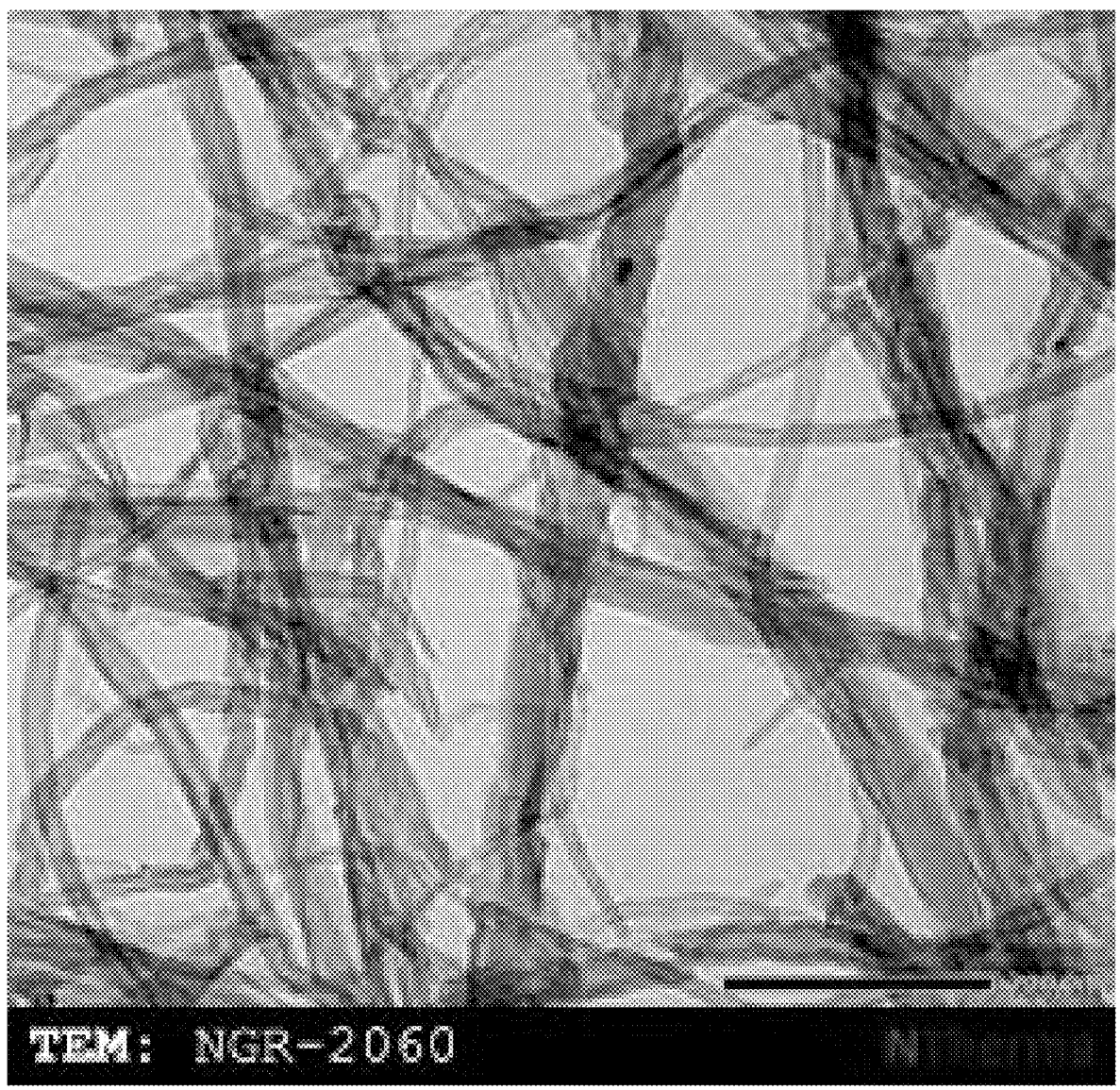
FIG. 14 illustrates an electron micrograph of high purity graphene nanoribbons.

In general, graphene nanoribbons can be prepared from CNTs by conventional methods known in the art which include but are not limited to acid oxidation (e.g., Kosynkin et al., Nature, 2009, 458, 872; Higginbotham et al., ACS Nano, 210, 4, 2596; Cataldo et al., Carbon, 2010, 48, 2596; Kang et al., J. Mater. Chem., 2012, 22, 16283; and Dhakate et al., Carbon 2011, 49, 4170), plasma etching (e.g, Jiao et al., Nature, 2009, 458, 877; Mohammadi et al., Carbon, 2013, 52, 451; and Jiao et al., Nano Res 2010, 3, 387), ionic intercalation, (e.g., Cano-Marques et al., Nano Lett. 2010, 10, 366), metal particle catalysis (e.g., Elias et al., Nano Lett. Nano Lett., 2010, 10, 366; and Parashar et. al., Nanaoscale, 2011, 3, 3876), hydrogenation (Talyzin et al., ACS Nano, 2011, 5, 5132) and sonochemistry (Xie et al., J. Am. Chem. Soc. 2011, DOI: 10.1021/ja203860). Any of the above methods may be used to prepare graphene nanoribbons from the CNTs described herein. Referring now to FIG. 14, an electron micrograph herein illustrates the high purity of the graphene nanoribbons produced by the methods described herein.

Figure 16:
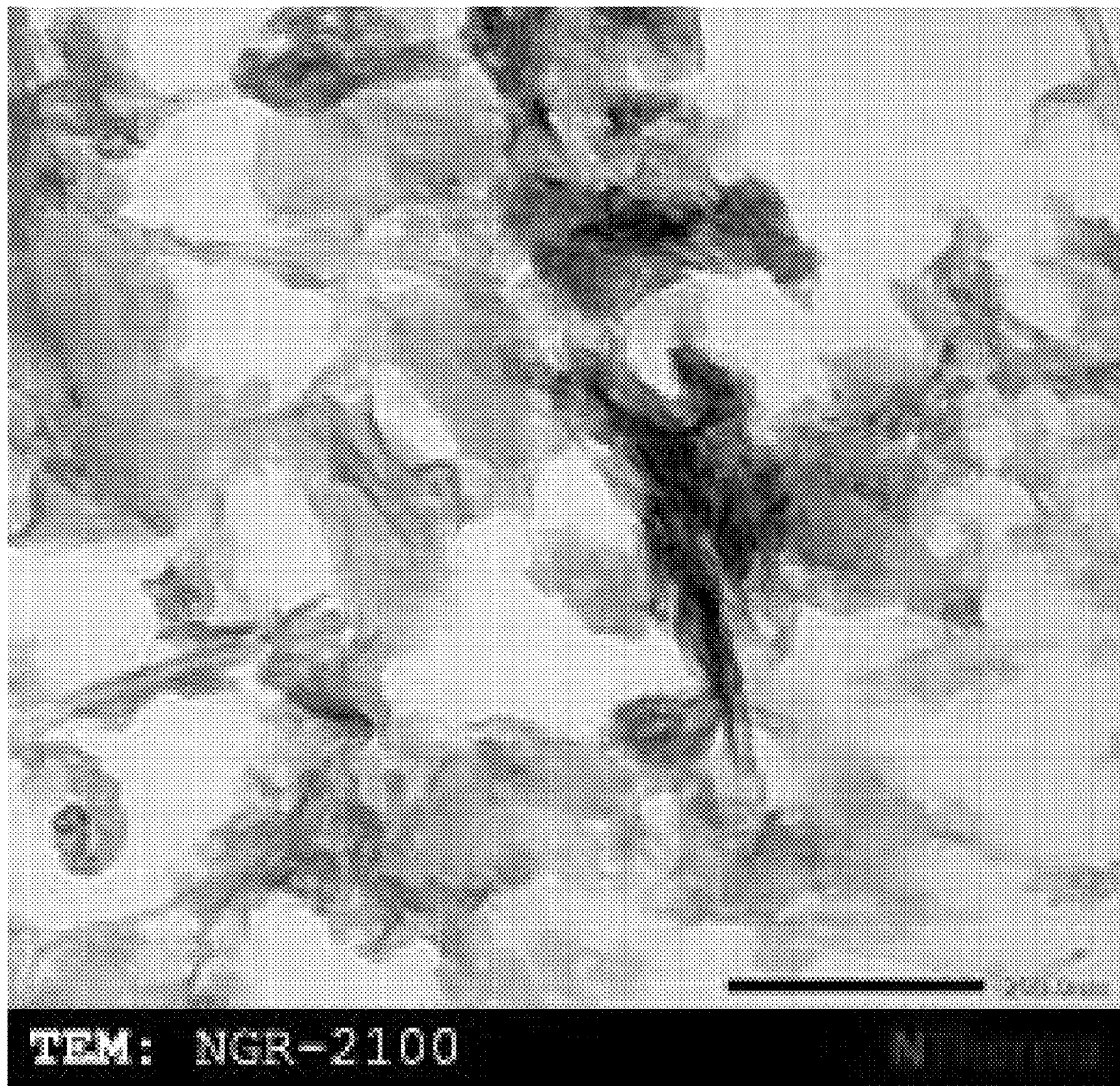
FIG. 16 illustrates an electron micrograph of high purity graphene nanoplatelets.

Graphene nanoplatelets may be produced from CNTs by further oxidation of GNRs produced from CNTs. Accordingly, those of skill in the art will understand that production of GNPs as described herein proceeds through the intermediacy of GNRs. For example, GNPs can be made from GNRs by acid oxidation at higher temperatures and/or longer reaction times or plasma etching at higher temperature or under more forcing conditions. Referring now to FIG. 16, an electron micrograph herein illustrates the high purity of the graphene nanoplatelets produced by the methods described herein.

Figure 15:
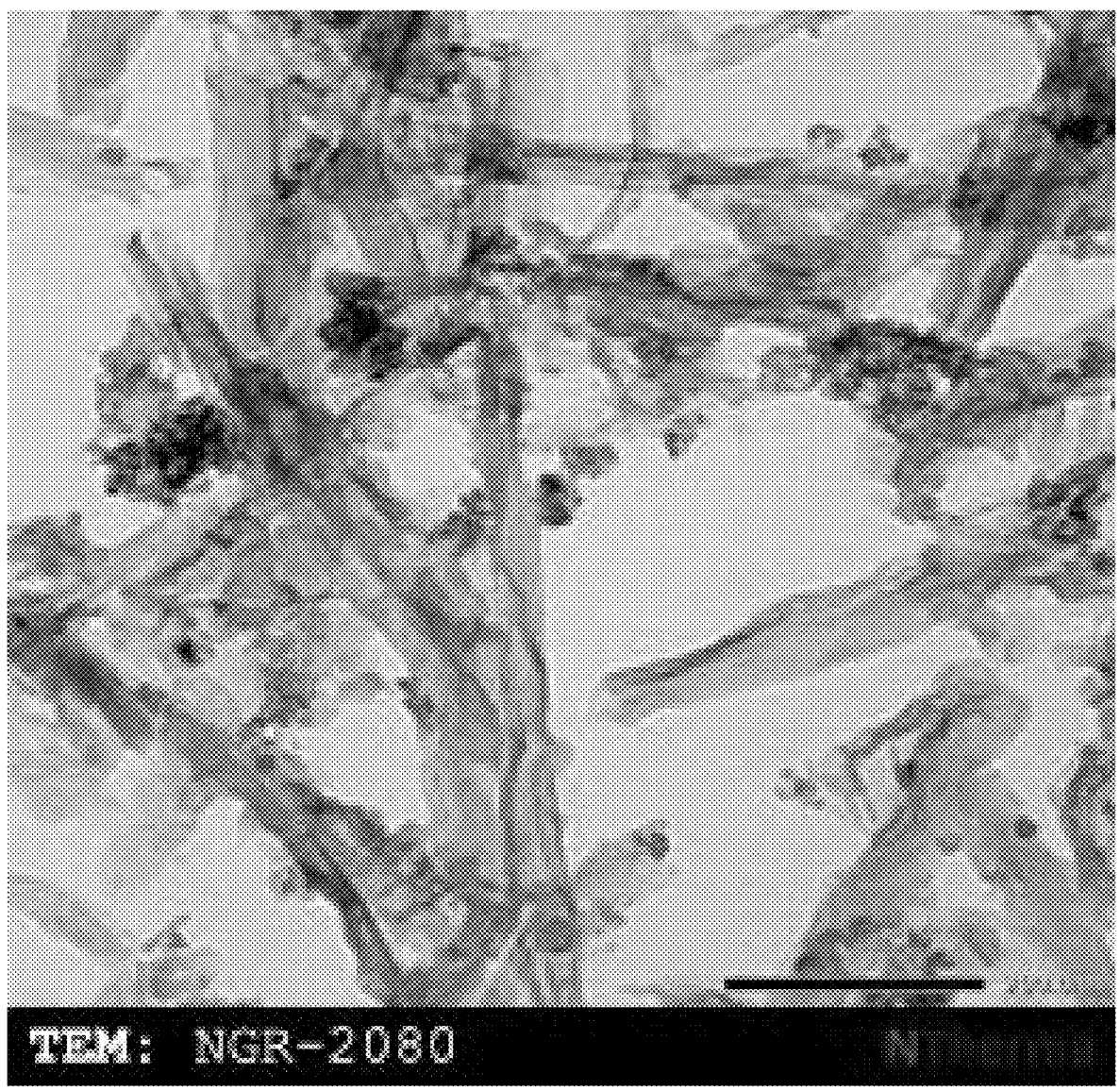
FIG. 15 illustrates an electron micrograph of a mixture of high purity graphene nanoribbons with graphene nanoplatelets.

Mixtures of graphene nanoplatelets and graphene nanoribbons are also provided herein. Such mixture may be provided by incomplete oxidation of graphene nanoribbons to graphene nanoplatelets or by mixing pure graphene nanoribbons with graphene nanoplatelets. Referring now to FIG. 15, an electron micrograph herein illustrates the high purity of a mixture of graphene nanoribbons and graphene nanoplatelets produced by the methods described herein. All mixtures of graphene nanoribbons and graphene nanoplatelets are envisioned herein. Accordingly, the mixture may range between about 0.001% graphene nanoribbons and about 99.999% graphene nanoplatelets to between about 99.999% graphene nanoribbons and about 0.0001% graphene nanoplatelets.

In some embodiments, a mixture of 1% graphene nanoribbons and about 99% graphene nanoplatelets is provided. In other embodiments, a mixture of 5% graphene nanoribbons and about 95% graphene nanoplatelets is provided. In still other embodiments, a mixture of 10% graphene nanoribbons and about 90% graphene nanoplatelets is provided. In still other embodiments, a mixture of 20% graphene nanoribbons and about 80% graphene nanoplatelets is provided. In still other embodiments, a mixture of 30% graphene nanoribbons and about 70% graphene nanoplatelets is provided. In still other embodiments, a mixture of 40% graphene nanoribbons and about 60% graphene nanoplatelets is provided. In still other embodiments, a mixture of 50% graphene nanoribbons and about 50% graphene nanoplatelets is provided. In still other embodiments, a mixture of 60% graphene nanoribbons and about 40% graphene nanoplatelets is provided. In still other embodiments, a mixture of 70% graphene nanoribbons and about 30% graphene nanoplatelets is provided. In still other embodiments, a mixture of 80% graphene nanoribbons and about 20% graphene nanoplatelets is provided. In still other embodiments, a mixture of 90% graphene nanoribbons and about 10% graphene nanoplatelets is provided. In still other embodiments, a mixture of 95% graphene nanoribbons and about 5% graphene nanoplatelets is provided. In still other embodiments, a mixture of 99% graphene nanoribbons and about 1% graphene nanoplatelets is provided.

In some embodiments, the uniform length of the graphene nanoribbons is on average about 10 μM, about 20 μM, about 50 μM, about 100 μM, about 150 μM or about 200 μM. In other embodiments, the uniform length can range from 50 μM to 2 cm. In general, the uniform length is about +/−10% of the stated length. Accordingly, a sample with a uniform length of about 100 μM will include GNRs of length between 90 μM and 110 μM.

In some embodiments, the graphene nanoribbons are made from carbon nanotubes of uniform length of which is on average about 10 μM, about 20 μM, about 50 μM, about 100 μM, about 150 μM or about 200 μM.

In some embodiments, the graphene nanoribbons are of greater than 90%, 95%, 99%, 99.5% or 99.9% purity. In other embodiments, graphene nanoribbons are of greater than 90%, 95%, 99%, 99.5% or 99.9% purity and are of uniform length of about 10 μM, about 20 μM, about 50 μM, about 100 μM, about 150 μM or about 200 μM.

In some embodiments, the uniform length of the graphene nanoplatelets is on average about about 10 μM, about 20 μM, 50 μM, about 100 μM, about 150 μM or about 200 μM. In other embodiments, the uniform length can range from 50 μM to 2 cm. In general, the uniform length is about +/−10% of the stated length. Accordingly, a sample with a uniform length of about 100 μM will include nanotubes of length between 90 μM and 110 μM.

In some embodiments, the graphene nanoplatelets are made from carbon nanotubes of uniform length of which is on average about 10 μM, about 20 μM, about 50 μM, about 100 μM, about 150 μM or about 200 μM.

In some embodiments, the graphene nanoplatelets are of greater than 90%, 95%, 99%, 99.5% or 99.9% purity. In other embodiments, graphene nanoribbons are of greater than 90%, 95%, 99%, 99.5% or 99.9% purity and are of uniform length of about 50 μM, about 100 μM, about 150 μM or about 200 μM.

In some embodiments, a mixture of 1% graphene nanoribbons and about 99% graphene nanoplatelets is provided. In other embodiments, a mixture of 5% graphene nanoribbons and about 95% graphene nanoplatelets is provided. In still other embodiments, a mixture of 10% graphene nanoribbons and about 90% graphene nanoplatelets is provided. In still other embodiments, a mixture of 20% graphene nanoribbons and about 80% graphene nanoplatelets is provided. In still other embodiments, a mixture of 30% graphene nanoribbons and about 70% graphene nanoplatelets is provided. In still other embodiments, a mixture of 40% graphene nanoribbons and about 60% graphene nanoplatelets is provided. In still other embodiments, a mixture of 50% graphene nanoribbons and about 50% graphene nanoplatelets is provided. In still other embodiments, a mixture of 60% graphene nanoribbons and about 40% graphene nanoplatelets is provided. In still other embodiments, a mixture of 70% graphene nanoribbons and about 30% graphene nanoplatelets is provided. In still other embodiments, a mixture of 80% graphene nanoribbons and about 20% graphene nanoplatelets is provided. In still other embodiments, a mixture of 90% graphene nanoribbons and about 10% graphene nanoplatelets is provided. In still other embodiments, a mixture of 95% graphene nanoribbons and about 5% graphene nanoplatelets is provided. In still other embodiments, a mixture of 99% graphene nanoribbons and about 1% graphene nanoplatelets is provided.

The skilled artisan will appreciate that the graphene nanoribbons and the graphene nanoplatelets in the mixture can have the same purity and/or uniform lengths described above for pure graphene nanoribbons and graphene nanoplatelets. In some embodiments, the mixtures of graphene nanoribbons and graphene have the same purity and the same uniform length. In other embodiments, the mixtures of graphene nanoribbons and graphene have different purity and the same uniform length. In still other embodiments, the mixtures of graphene nanoribbons and graphene have the same purity and different length.

The purity and structural uniformity, such as, for example, length and width of graphene nanoribbons and graphene nanoplatelets or mixtures thereof, is essential for manufacturing regularity to consistently provide high performance and superior quality graphene nanoribbon, graphene nanoplatelet or mixtures thereof containing products. Some examples of uses of graphene nanoribbons, graphene nanoplatelets or mixtures thereof are as fillers in polymeric composites, protective coatings on metal surfaces, (reduces wear of metal surfaces, leads to reduction in coefficient of friction) lubricant additives, contrast imaging agents, nanoelectronics, transistor material, transparent conductive films, sensor, electrode material for batteries including LI-ion batteries for EVs, and supercapacitors.

Graphene nanoribbons, graphene nanoplatelets or mixtures thereof are useful oil and lubricant additives. In some embodiments, graphene nanoribbons, graphene nanoplatelets or mixtures thereof, which are greater than 90%, 95%, 99%, 99.5% or 99.9% purity form a stable suspension when added to a lubricant or an oil. In other embodiments, graphene nanoribbons, graphene nanoplatelets or mixtures thereof, which are greater than 90%, 95%, 99%, 99.5% or 99.9% purity and are of uniform length of about 50 μM, about 100 μM, about 150 μM or about 200 μM form a stable suspension when added to a lubricant or oil.

Graphene nanoribbons, graphene nanoplatelets or mixtures thereof reduce the coefficient of friction to less than 0.07 when used as lubricant or oil additives. In some embodiments, graphene nanoribbons, graphene nanoplatelets or mixtures thereof of greater than 90%, 95%, 99%, 99.5% or 99.9% purity reduce the coefficient of friction in lubricants or oils to less than 0.07. In other embodiments, graphene nanoribbons, graphene nanoplatelets or mixtures thereof, which are greater than 90%, 95%, 99%, 99.5% or 99.9% purity and are of uniform length of about 50 μM, about 100 μM, about 150 μM or about 200 μM purity reduce the coefficient of friction in lubricants or oil to less than 0.07.

Graphene nanoribbons, graphene nanoplatelets or mixtures thereof reduce the coefficient of friction to less than 0.05 when used as lubricant or oil additives. In some embodiments, graphene nanoribbons, graphene nanoplatelets or mixtures thereof of greater than 90%, 95%, 99%, 99.5% or 99.9% purity reduce the coefficient of friction in lubricants and oils to less than 0.07. In other embodiments, graphene nanoribbons, graphene nanoplatelets or mixtures thereof, which are greater than 90%, 95%, 99%, 99.5% or 99.9% purity and are of uniform length of about 50 μM, about 100 μM, about 150 μM or about 200 μM purity reduce the coefficient of friction in lubricants and oils to less than 0.05.

Graphene nanoribbons, graphene nanoplatelets or mixtures thereof when used as a lubricant or oil additive improve fuel consumption. In some embodiments, graphene nanoribbons, graphene nanoplatelets or mixtures thereof of greater than 90%, 95%, 99%, 99.5% or 99.9% purity when used as a lubricant or oil additive improve fuel consumption by greater than 3%, greater than 5%, greater than 10% or greater than 20%. In other embodiments, graphene nanoribbons, graphene nanoplatelets or mixtures thereof, which are greater than 90%, 95%, 99%, 99.5% or 99.9% purity and are of uniform length of about 50 μM, about 100 μM, about 150 μM or about 200 μM purity when used as a lubricant or oil additive improve fuel consumption by greater than 3%, greater than 5%, greater than 10% or greater than 20%.

Graphene nanoribbons, graphene nanoplatelets or mixtures thereof when used as a lubricant or oil additive reduce smoke and/or NOx emission. In some embodiments, graphene nanoribbons, graphene nanoplatelets or mixtures thereof of greater than 90%, 95%, 99%, 99.5% or 99.9% purity when used as a lubricant or oil additive reduce smoke and/or NOx emission. In other embodiments, graphene nanoribbons, graphene nanoplatelets or mixtures thereof, which are greater than 90%, 95%, 99%, 99.5% or 99.9% purity and are of uniform length of about 50 μM, about 100 μM, about 150 μM or about 200 μM purity when used as a lubricant or oil additive reduce smoke and/or NOx emission.

Lubricants or oils which include graphene additives reduce friction, increase mileage, extend engine life, increase horsepower and acceleration, reduce engine noise and increase fuel efficiency. Without wishing to bound by theory the lubricant, which includes graphene nanoribbons, graphene nanoplatelets or mixtures thereof coats all moving components with a protective film of fluid. The extreme mechanical strength of graphene additives is of great significance in protecting moving parts from excessive wear.

In some embodiments, graphene nanoribbons, graphene nanoplatelets or mixtures thereof reduce engine wear when used as a lubricant or oil additive. In other embodiments, graphene nanoribbons, graphene nanoplatelets or mixtures thereof improve engine lifetime when used as a lubricant or oil additive. Without wishing to bound by theory graphene nanoribbons, graphene nanoplatelets or mixtures thereof when used as a lubricant or oil additive may form a protective coating on engine components which reduces engine wear and/or increases engine lifetime. In some embodiments, the graphene nanoribbons, graphene nanoplatelets or mixtures thereof of greater than 90%, 95%, 99%, 99.5% or 99.9% purity when used as a lubricant or oil additive reduce engine wear and/or increases engine lifetime. In other embodiments, graphene nanoribbons, graphene nanoplatelets or mixtures thereof, which are greater than 90%, 95%, 99%, 99.5% or 99.9% purity and are of uniform length of about 50 µM, about 100 µM, about 150 µM or about 200 µM purity when used as an additive in lubricants or oils reduces engine wear and/or increases engine lifetime.

Finally, it should be noted that there are alternative ways of implementing the present invention. Accordingly, the present embodiments are to be considered as illustrative and not restrictive, and the invention is not to be limited to the details given herein but may be modified within the scope and equivalents of the appended claims.

All publications and patents cited herein are incorporated by reference in their entirety.

The following examples are provided for illustrative purposes only and are not intended to limit the scope of the invention.

Example 1: Thermogravimetric Analysis of Multiwalled CNTs

Figure 10:
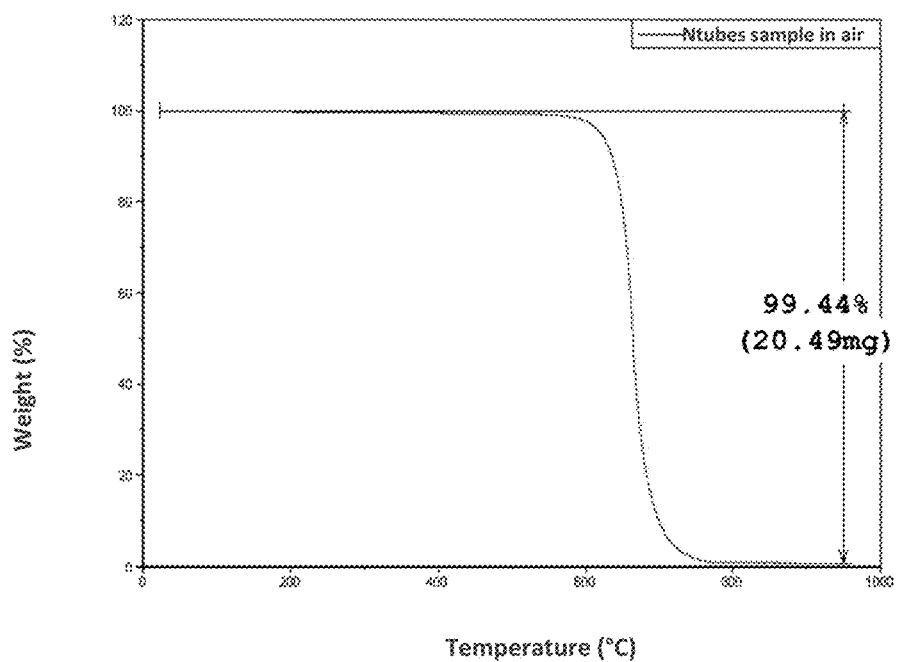
FIG. 10 illustrates TGA results which show greater than 99.4% purity for MWCNTs produced by the methods and apparatus described herein.

The carbon purity and thermal stability of CNTs were tested using a Thermogravimetric Analyzer (TGA), TA instruments, Q500. The samples were heated under air atmosphere (Praxair AI NDK) from temperature to 900° C. at a rate of 10° C./min and held at 900° C. for 10 minutes before cooling. Carbon purity is defined as (weight of all carbonaceous material)/(weight of all carbonaceous materials+weight of catalyst). The inflection point is the temperature at which thermal degradation reaches its maximum value. The onset point is the temperature at which about 10% of the material degrades owing to high temperature. FIG. 10 illustrates thermal stability data for multi-walled carbon nanotubes made by the methods and devices described herein. The multi-walled carbon nanotubes made herein have an inside diameter of about 5 nm with between 5-8 walls with a customizable length of between 10 µM and 200 µM. In the region below 400° C. is where amorphous carbon and carbonaceous materials with poor thermal resistance were degraded. As can be seen from the graph there is almost no amorphous carbon and carbonaceous materials in the multi-walled carbon nanotubes made by the methods and devices described herein. The inflection point is 721° C., the onset point is 644° C. and the carbon purity is greater than 99.4%. In contrast, in a commercially available CNT (not shown) the inflection point is 643° C., the onset point is 583° C. and the carbon purity is 90%.

Example 2: Raman Analysis of Multiwalled CNTs 10 mg of CNTs were suspended in about 100 mL of methanol to form a blackish solution. The resulting suspension was then sonicated for about 10 minutes to uniformly disperse CNTs in the suspension since a thin layer of CNTs is required for Raman spectra. The suspension was then spread over Si substrate to form a thin layer. The coated Si substrate was then placed in an oven for 10 minutes at 130° C. to vaporize the dispersing agent from the sample. Raman spectra were then recorded with a Thermos Nicolet Dispersive XR Raman Microscope with a laser radiation of 532 nm, integration of 50 s, 10× objective and a laser of 24 mW. The ratio of D and G band intensities is often used as a diagnostic tool to verify the structural perfection of CNTs.

Figure 11:
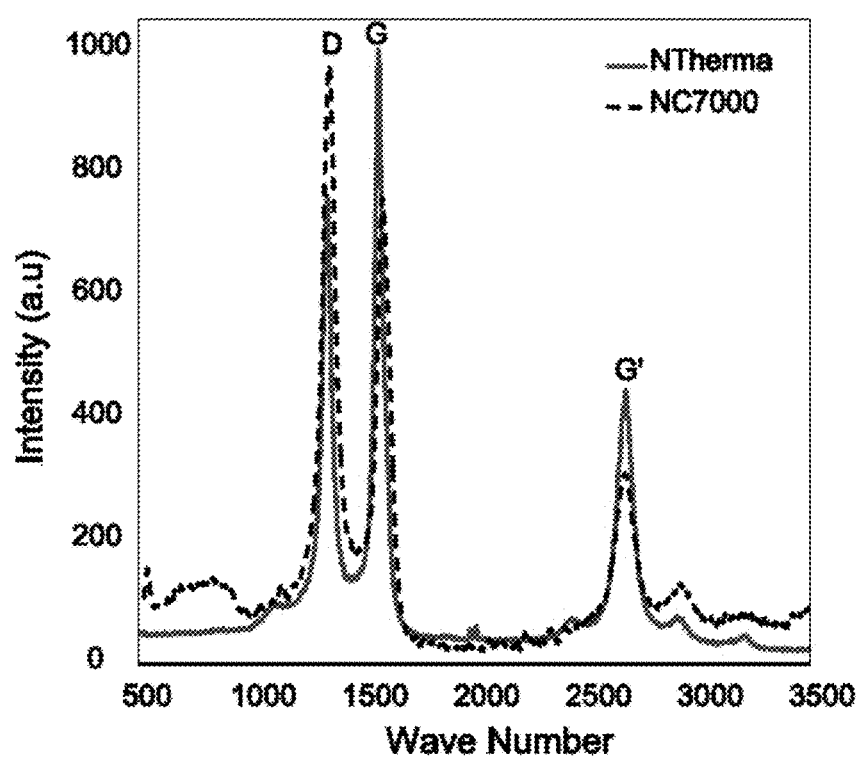
FIG. 11 illustrates Raman spectra which shows that MWCNTs produced by the methods and apparatus described herein are highly crystalline when compared to industrial grade samples.

FIG. 11 illustrates Raman spectra of multi-walled carbon nanotubes made by the methods and devices described herein (solid line) and commercially available CNTs (dashed line). The ID/IG and the IG/IG' ratio of the multi-walled carbon nanotubes made by the methods and devices described herein are 0.76 and 0.44 respectively, while the same ratios for commercially available CNTs are 1.27 and 0.4, respectively. The above demonstrates, the greater crystallinity of the multi-walled carbon nanotubes made by the methods and devices described herein over those produced by other methods and is in accord with the thermal stability data.

Example 3: Thermogravimetric Analysis of Multiwalled GNRs

Figure 13:
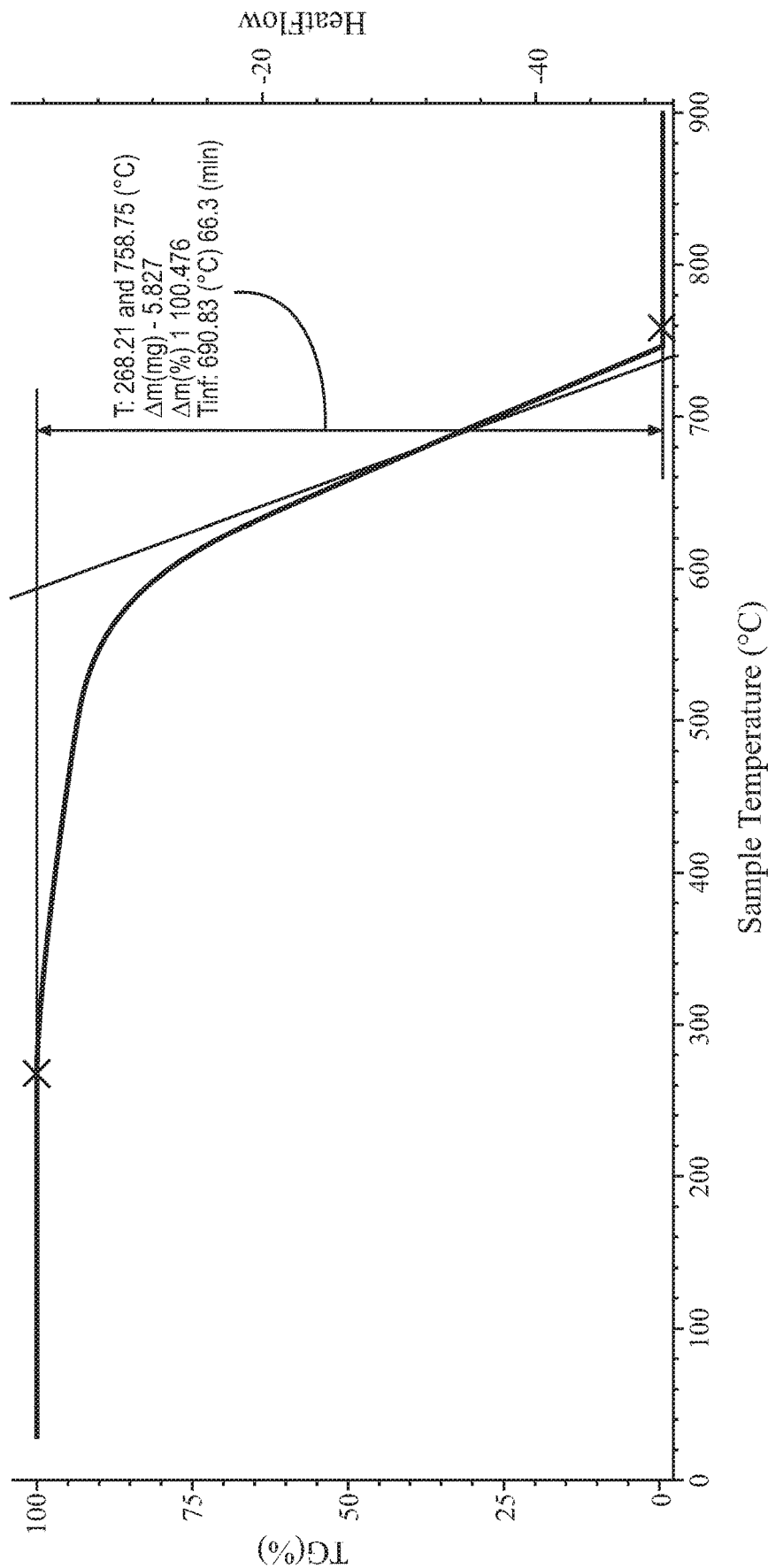
FIG. 13 illustrates TGA results which show greater than 99% purity for graphene nanoribbons produced by the methods described herein.

The carbon purity and thermal stability of CNTs were tested using a Thermogravimetric Analyzer (TGA), TA instruments, Q500. The samples were heated under air atmosphere (Praxair AI NDK) from temperature to 900° C. at a rate of 10° C./min and held at 900° C. for 10 minutes before cooling. Carbon purity is defined as (weight of all carbonaceous material)/(weight of all carbonaceous materials+weight of catalyst). The inflection point is the temperature at which thermal degradation reaches its maximum value. The onset point is the temperature at which about 10% of the material degrades owing to high temperature. FIG. 13 illustrates thermal stability data for GNRs made by the methods described herein. The GNRs made have a customizable length of between 10 µM and 200 µM. In the region below 400° C. is where amorphous carbon and carbonaceous materials with poor thermal resistance were degraded. As can be seen from the graph there is almost no amorphous carbon and carbonaceous materials in the GNRs made by the methods and devices described herein. The inflection point is 690° C. and the carbon purity is greater than 99.4%.

Figure 12:
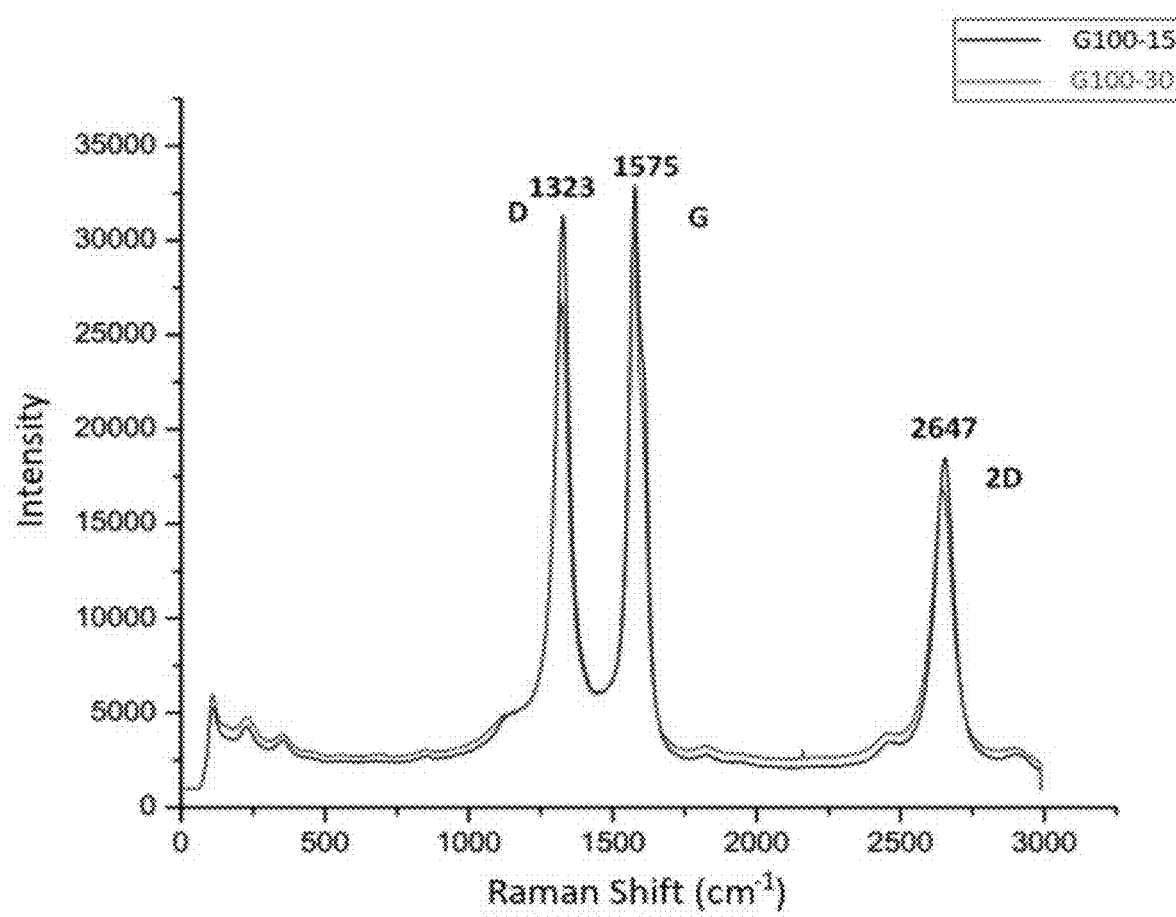
FIG. 12 illustrates Raman spectra which shows that graphene nanoribbons produced by the methods described herein are highly crystalline when compared to industrial grade samples.

Example 4: Raman Analysis of GNRs 10 mg of CNTs were suspended in about 100 mL of methanol to form a blackish solution. The resulting suspension was then sonicated for about 10 minutes to uniformly disperse CNTs in the suspension since a thin layer of CNTs is required for Raman spectra. The suspension was then spread over Si substrate to form a thin layer. The coated Si substrate was then placed in an oven for 10 minutes at 130° C. to vaporize the dispersing agent from the sample. Raman spectra as illustrated in FIG. 12 were then recorded with a Thermos Nicolet Dispersive XR Raman Microscope with a laser radiation of 532 nm, integration of 50s, 10X objective and a laser of 24 mW. The ratio of D and G band intensities is often used as a diagnostic tool to verify the structural perfection of CNTs.

FIG. 13 illustrates Raman spectra of GNRs made by the methods described herein (solid line). The I2D/IG and ID/IG of the GNRs made by the methods described herein are 0.6 and 0.75 respectively, which demonstrates the standard graphene signature and illustrates minimal defects from the chemical unzipping process.

Figure 17:
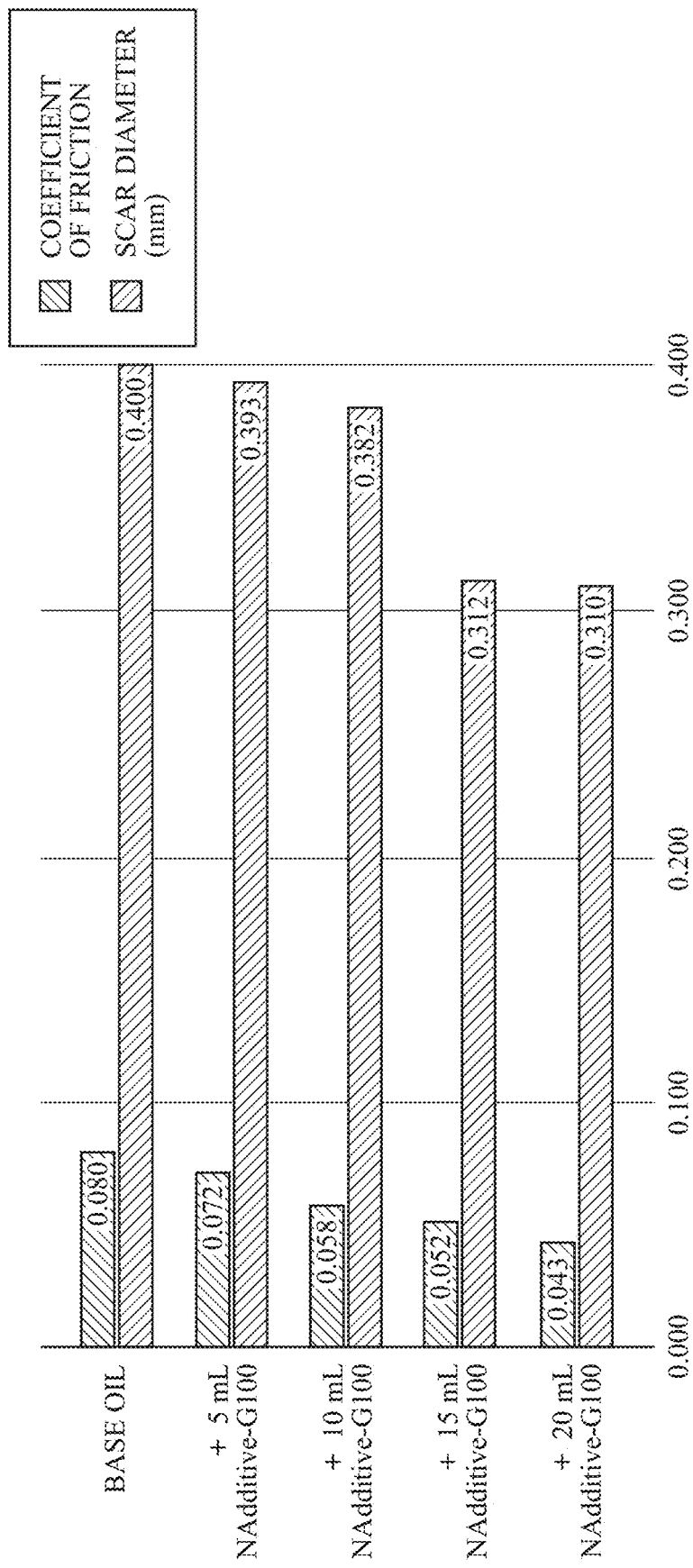
FIG. 17 illustrates how increasing the concentration of graphene (Nadditive-G100) in base oil reduces the friction coefficient and scar diameter in the four ball testing parameter.

Example 5: Frictional Coefficient and Scar Test Results for Graphene Based Engine Oil Nanofluids A standard four ball testing machine was used to measure the effect of increasing concentration of Nadditive-G100 (about 70% nanoplatelets and about 30% graphene nanoribbons) with purity of greater than 99% in motor oil SN 5W-40. The tester was operated with one steel ball under load rotating against three steel balls held stationary in a cradle. The rotating speed was 1200 RPM at 75° C. under a constant load of 40 Kg/F for a duration of 60 minutes. The results are show in FIG. 17, which demonstrates that increasing amounts of N-additive-G100 in motor oil significantly reduces the coefficient of friction and scar diameter.

Example 6: Vehicle Testing of Graphene Based Engine Oil Nanofluids

| Vehicle (Year) | Fuel consumption for commercial oil | Fuel consumption for graphene oil (25 mg/L of N-G100) in commercial oil | Efficiency increase (%) |
|---|---|---|---|
| Honda Pilot (2014) | 23.45 mpg | 25.82 mpg | 10.1 |
| VW Golf | 20.67 mpg | 22.63 mpg | 9.5 |
| Mitsubishi Lancer | 25.78 mpg | 28 mpg | 8.6 |

The above results show that graphene oil additives increase fuel consumption in tested vehicles by between about 10% to about 20%.

What is claimed is:

1. A method for synthesizing graphene nanoribbons consisting of:
   continuously depositing catalyst on a constantly moving substrate;
   forming multi-walled carbon nanotubes on the substrate;
   separating the multi-walled carbon nanotubes from the substrate;
   collecting the multi-walled carbon nanotubes; and
   converting the multi-walled carbon nanotubes to graphene nanoribbons;
   wherein the substrate moves sequentially through the depositing, forming, separating, collecting and converting steps and the graphene nanoribbons are of greater than 95% purity.

2. The method of claim 1, wherein the graphene nanoribbons are of uniform length.

3. The method of claim 2, wherein the uniform length is about 50 μMm, about 100 μm, about 150 μm, about 200 μm or about 500 μm.

4. The method of claim 1, wherein the graphene nanoribbons are of greater than 99%, 99.5% or 99.9% purity.

5. The method of claim 1, wherein the graphene nanoribbons are of greater than 99%, 99.5% or 99.9% purity and are of uniform length of about 50 μMm, about 100 μm, about 150 μm, about 200 μm or about 500 μm.

6. The method of claim 1, wherein the multi-walled carbon nanotubes are converted to graphene nanoribbons by chemical oxidation, plasma etching, electrochemical oxidation or sonochemistry.

7. A method for synthesizing a mixture of graphene nanoribbons and graphene nanoplatelets consisting of:
   continuously depositing catalyst on a constantly moving substrate;
   forming multi-walled carbon nanotubes on the substrate;
   separating the multi-walled carbon nanotubes from the substrate;
   collecting the multi-walled carbon nanotubes; and
   converting the multi-walled carbon nanotubes to a mixture of graphene nanoribbons and graphene nanoplatelets;
   wherein the substrate moves sequentially through the depositing, forming, separating, collecting and converting steps and the mixture of graphene nanoribbons and graphene nanoplatelets are of greater than 95% purity.

8. The method of claim 7, wherein the graphene nanoribbons and graphene nanoplatelets are of greater than 99%, 99.5% or 99.9% purity.

9. A method for synthesizing graphene nanoplatelets consisting of:
   continuously depositing catalyst on a constantly moving substrate;
   forming multi-walled carbon nanotubes on the substrate at a temperature;
   separating the multi-walled carbon nanotubes from the substrate;
   collecting the multi-walled carbon nanotubes; and
   converting the multi-walled carbon nanotubes to graphene nanoplatelets;
   wherein the substrate moves sequentially through the depositing, forming, separating, collecting, and converting steps and the graphene nanoplatelets are of greater than 95% purity.

10. The method of claim 1, wherein the graphene nanoplatelets are of greater than 99%, 99.5% or 99.9% purity.

* * * * *

UNITED STATES PATENT AND TRADEMARK OFFICE
CERTIFICATE OF CORRECTION

| | | |
|---|---|---|
| PATENT NO. | : 11,560,313 B2 | Page 1 of 1 |
| APPLICATION NO. | : 16/837030 | |
| DATED | : January 24, 2023 | |
| INVENTOR(S) | : Cattien V. Nguyen | |

It is certified that error appears in the above-identified patent and that said Letters Patent is hereby corrected as shown below:

In the Claims

Column 18 Claim 10, Line 42, "1" should read -9-.

Signed and Sealed this
Thirtieth Day of July, 2024

*Katherine Kelly Vidal*

Katherine Kelly Vidal
*Director of the United States Patent and Trademark Office*